(12) United States Patent  
Davenport et al.

(10) Patent No.: US 12,244,604 B2
(45) Date of Patent: Mar. 4, 2025

(54) COMPANION DEVICE AUTHENTICATION

(71) Applicant: Apple Inc., Cupertino, CA (US)

(72) Inventors: Caleb M. Davenport, Sunnyvale, CA (US); Quenton D. Jones, Layton, UT (US); Paul J. Sholtz, San Jose, CA (US); Peter J. Hare, Aliso Viejo, CA (US)

(73) Assignee: Apple Inc., Cupertino, CA (US)

( * ) Notice: Subject to any disclaimer, the term of this patent is extended or adjusted under 35 U.S.C. 154(b) by 563 days.

(21) Appl. No.: 17/408,369

(22) Filed: Aug. 20, 2021

(65) Prior Publication Data

US 2022/0345464 A1 Oct. 27, 2022

Related U.S. Application Data

(60) Provisional application No. 63/179,165, filed on Apr. 23, 2021.

(51) Int. Cl.
*H04L 9/40* (2022.01)
*G06Q 20/38* (2012.01)
(Continued)

(52) U.S. Cl.
CPC ..... *H04L 63/107* (2013.01); *G06Q 20/38215* (2013.01); *G06Q 20/4014* (2013.01);
(Continued)

(58) Field of Classification Search
CPC . H04L 63/107; H04L 63/0807; H04L 63/083; H04L 63/0861; H04L 63/102; H04L 63/105; H04L 67/1044; H04L 67/1061; H04L 2463/102; H04L 67/02; H04L 67/34; H04L 67/10; H04L 63/0876; H04L 63/0853; G06Q 20/38215; G06Q 20/4014; G06Q 20/4015; G06Q 2220/00; G06Q 20/223; G06Q 20/32; G06Q 20/385; G06Q 20/42; H04W 12/06; H04W 12/50; H04W 12/63
See application file for complete search history.

(56) References Cited

U.S. PATENT DOCUMENTS

2014/0157382 A1* 6/2014 Ford ................... H04W 12/128
                                      726/7
2016/0050219 A1* 2/2016 Niewczas ............. H04W 12/10
                                      726/5

(Continued)

OTHER PUBLICATIONS

International Search Report and Written Opinion from PCT/US2022/026058, dated Jul. 29, 2022, 13 pages.

*Primary Examiner* — Mohammad W Reza
(74) *Attorney, Agent, or Firm* — BAKERHOSTETLER

(57) ABSTRACT

The subject disclosure provides systems and methods for companion device authentication. A user of a first device may not have access to a service that can be provided by the first device. The service may be a streaming service, a cloud-based service, or the like. Companion device authentication can allow the user, or another user, to authorize access to the service at the first device, using a companion device to the first device. The first device and the companion device may exchange communications to nominate the companion device prior to notifying a user of the companion device of a companion device authentication request for the first device.

30 Claims, 13 Drawing Sheets

(51) Int. Cl.
*G06Q 20/40* (2012.01)
*H04L 67/104* (2022.01)
*H04L 67/1061* (2022.01)

(52) U.S. Cl.
CPC ..... *G06Q 20/4015* (2020.05); *H04L 63/0807* (2013.01); *H04L 63/083* (2013.01); *H04L 63/0861* (2013.01); *H04L 63/102* (2013.01); *H04L 63/105* (2013.01); *H04L 67/1044* (2013.01); *H04L 67/1061* (2013.01); *G06Q 2220/00* (2013.01); *H04L 2463/102* (2013.01)

(56) References Cited

U.S. PATENT DOCUMENTS

| | | |
|---|---|---|
| 2019/0173876 A1 | 6/2019 | Rayles |
| 2019/0286806 A1 | 9/2019 | Robinson et al. |
| 2019/0332787 A1* | 10/2019 | Graf .................. G06F 16/95 |
| 2020/0233949 A1 | 7/2020 | Xia et al. |
| 2020/0294028 A1 | 9/2020 | Lee |
| 2020/0351660 A1 | 11/2020 | Avetisov et al. |
| 2020/0380510 A1 | 12/2020 | Hare |
| 2020/0396278 A1* | 12/2020 | Miller .................. H04L 67/104 |

\* cited by examiner

COMPANION DEVICE AUTHENTICATION

CROSS REFERENCE TO RELATED APPLICATIONS

This application claims the benefit of priority to U.S. Provisional Patent Application No. 63/179,165, entitled "Companion Device Authentication," filed on Apr. 23, 2021, the disclosure of which is hereby incorporated herein in its entirety.

TECHNICAL FIELD

The present description relates generally to authenticated access to applications, content, and services for electronic devices.

BACKGROUND

Users of electronic devices often access streaming services via an application on the electronic device. When a user is logged into the electronic device, and has previously logged into a streaming service on that electronic device, the user is often provided with later access to the streaming service without having to again login to the streaming service. Some electronic devices allow users other than the user that is logged into that electronic device, to log into a streaming service on that electronic device. However, in various scenarios, it can be cumbersome and/or inefficient for the users to coordinate their separate login information on the user's device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
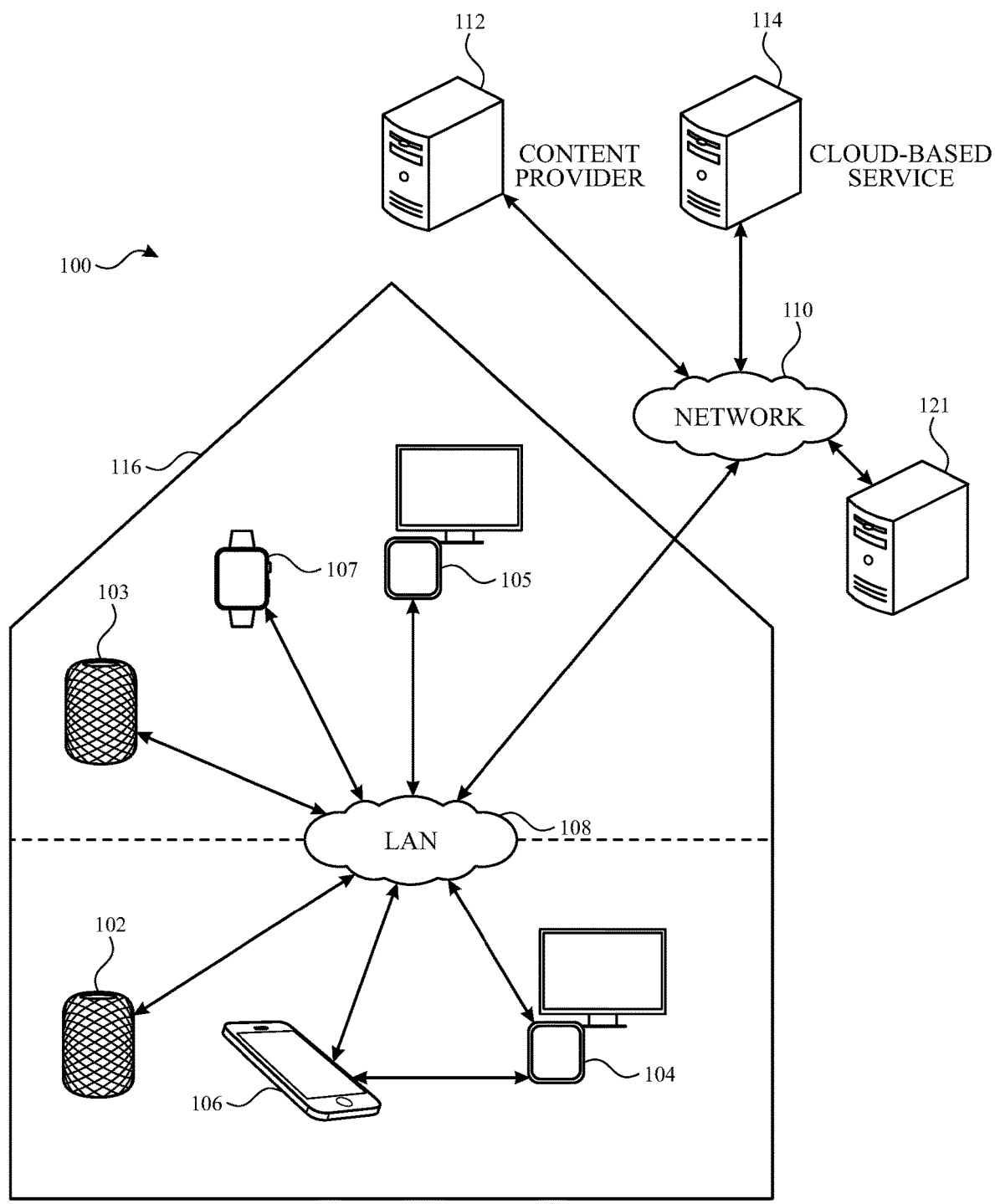
FIG. 1 illustrates an example network environment that includes an environment containing user devices in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject technology provides for sign-in or login to an application and/or service on a first device, using an authentication operation that is at least partially performed at another device (e.g., also referred to herein as a companion device or an authentication device) that is proximate to the first device. The companion device may provide, to the first device, credentials for the application and/or service itself, and/or credentials of a user account associated with the companion device (e.g., a user account for a user of the companion device) that can be used by the first device to obtain the credentials for the application and/or service. The companion device may be logged into and/or registered with the user account associated with the companion device. The user account for the companion device may be the same as, or different from, a user account associated with the first device (e.g., a user account that the first device is logged into or registered with, such as a user account of a user of the first device). In this way, aspects of the disclosed technology allow for an expanded use of companion devices to authenticate access to applications and/or services at the first device.

In one or more implementations, when companion device authentication is requested at the first device, the first device may broadcast a beacon for potential authentication devices. Devices in proximity to the first device may not be noticeably activated for performing the authentication operations until after a particular one of the devices is nominated by the user of that particular device, with an action at that particular device. Waiting to provide, for example, a notification on the companion/authentication device until the device is nominated to perform the authentication may prevent alerts and/or buzzing by all proximate devices, which can be undesirable to some users and can waste power and computing resources by devices (e.g., including companion devices) that are not ultimately used for the authentication.

The subject technology also provides for purchases or other approvals (e.g., approvals of Terms and Conditions, approvals for download and/or installation of software such as applications, etc.) initiated at a first device, using an approval and/or authentication operation that is at least partially performed at another device (e.g., also referred to herein as a companion device, an approval device, or an authentication device) that is proximate to the first device. For example, the first device may initiate a purchase or other approval process with a server, and then hand off the approval process to the companion device. The companion device may provide an authorization or approval for the purchase or other approval process to the server and obtain a token corresponding to the purchase or other approval process from the server. The companion device may provide the token to the first device, and the first device may then complete the purchase or other approval process with the server using the token received from the companion device. In this way, aspects of the disclosed technology allow for an expanded use of companion devices to provide approvals such as authenticated approvals for purchases of, and/or purchases via, applications and/or services at the first device.

FIG. 1 illustrates an example network environment 100 that includes various devices in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103, 104, 105, 106 and 107 (hereinafter "the electronic devices 102-107"), a local area network ("LAN") 108, a network 110, and one or more content providers such as content provider 112, one or more cloud-based service(s) such as cloud-based service 114, and one or more merchant services such as merchant server 121.

Content provider 112 may provide access to content such as streaming content (e.g., video content, audio content) or other subscription-based content (e.g., electronic book content or the like) to user devices (e.g., to one or more of the electronic devices 102-107) that are associated with a user account that has been established with the content provider 112. Cloud-based service 114 may provide access to cloud-based storage, content (e.g., photos, videos, calendar information, etc.) stored in the cloud-based storage, applications (e.g., gaming applications, streaming applications, and/or any other application) to user devices (e.g., to one or more of the electronic devices 102-107) that are associated with a user account that has been established with the cloud-based service 114. Users of the electronic devices 102-107 may provide authentication information to that device, to log that device into one or more accounts that are maintained for that user at one or more of the content provider 112 and/or the cloud-based service 114 and/or to authorize and/or approve purchases (e.g., purchases of applications, rental of streaming media, purchase of streaming media, and/or any other purchases that can be made over the network 110) from the one or more of the content provider 112 and/or the cloud-based service 114. Merchant server 121 may represent one or more merchant servers that may process purchases and/or payments (e.g., in cooperation with a payment server for a bank, a credit card server, or other payment service) for the content provider 112, the cloud-based service 114, and/or any other network-connected merchants, in one or more implementations.

In accordance with aspects of the subject disclosure, electronic devices such as electronic device 106 or electronic device 107, can be used as companion devices, or authentication devices, to provide an authentication for access to and/or purchases from content provider 112 and/or cloud-based service 114 by another device, such as electronic device 102, electronic device 103, electronic device 104 and/or electronic device 105.

For example, electronic device 105 and electronic device 106 may both be logged into a first user account (e.g., a first user account of a first user) with cloud-based service 114 or another server. In an exemplary operational scenario, the electronic device 105 may also be logged into a user account with content provider 112 using an application for the content provider on the electronic device 105. Electronic device 105 and/or cloud-based service 114 may securely store the authentication information for content provider 112 in association with the first user account with cloud-based service 114, so that the electronic device 105 can access the content provider 112 repeatedly without re-authenticating with the content provider 112 for each access.

In an exemplary scenario, electronic device 104 may be logged into a second user account (e.g., a second user account of a second user) with cloud-based service 114 or another server. In this example, although the application for content provider 112 may be installed at electronic device 104, the electronic device 104 may not be associated with an account with content provider 112, or may not be logged into an account with content provider 112

The first user may, for example, be a sole user or a primary user of the electronic device 105, and the second user may be a sole user or a primary user of the electronic device 104. In some scenarios, the first user may also be a secondary user of the electronic device 104, and the first user may access the content provider 112 by switching to become the primary user of the electronic device 104. However, there are other scenarios in which the first user may not be a user of the electronic device 104, but may still desire to access the content provider 112 using the electronic device 104.

For example, the first user may be a guest at a home or other location of the second user, and the first and second users may desire to stream a movie from content provider 112 using electronic device 104. Because the second user of the electronic device 104 does not have an account with content provider 112, authentication of the first user's account with the content provider 112 may be required in order to stream the movie using the first user's account and using the second user's electronic device 104.

In some scenarios, the first user can operate the electronic device 104 to authenticate the first user's account with (e.g., log into) the content provider 112 by typing a user name and a password for their account with the content provider into the electronic device 104. However, when the electronic device 104 is implemented in the form of a media player (or of a smart speaker such as in the example of electronic device 102), the electronic device 104 (e.g., not having a keyboard or a touch interface) may be more difficult to operate for this type of operation than the electronic device 106 (e.g., which may have a touchscreen that can provide a keyboard). Moreover, the authentication information for authenticating with the content provider 112 may already be securely stored for the first user's account (e.g., at the electronic device 106 and/or at the cloud-based service), in connection with the cloud-based service to which the electronic device 106 is logged in and/or registered.

Aspects of the subject technology facilitate using the electronic device 106 (or another electronic device such as electronic device 107) as an authentication device (also referred to herein as an authentication device) for electronic device 104, to provide authentication of the first user with the content provider 112, when the electronic device 106 is in proximity to the electronic device 104 (e.g., within range of a Bluetooth connection or a secure direct Wi-Fi connection). In some scenarios, the application for the content provider 112 may also be installed at the electronic device 106, and the application can be launched at electronic device 106, and used to provide the authentication information to the corresponding application at electronic device 104. However, in other scenarios, the application for the content provider 112 may not be installed or accessible at the electronic device 106, even though the first user of the electronic device 106 has an account with the content provider.

Aspects of the subject technology facilitate using electronic device 106 (or another electronic device such as electronic device 107) as a companion device, or an authentication device, for electronic device 104, for authentication of the first user's account with the content provider 112, when the electronic device 106 is in proximity to the electronic device 104, even when the application for content provider 112 is not installed or accessible at the companion device (e.g., for third party applications that do not have a presence on the companion device).

Various ones of the electronic devices 102-107 may be single user devices or multi-user devices. Single user devices (e.g., electronic devices 106 and 107) may be associated with a single user account such as an individual user account with one or more of the servers 112-114. Multi-user devices (e.g., electronic devices 102, 103, 104, and 105) may provide functionality to switch the current state of the device between the individual user accounts of one or more users and/or a single group account that is associated with a group of users (e.g., at a remote server such as cloud-based service 114). In one or more implementations, the electronic devices 102-107 may form part of a connected home environment 116, and the LAN 108 may communicatively (directly or indirectly) couple any two or more of the electronic devices 102-107 within the connected home environment 116. Moreover, the network 110 may communicatively (directly or indirectly) couple any two or more of the electronic devices 102-107 with the content provider 112 and/or the cloud-based service 114, for example, in conjunction with the LAN 108. As illustrated in FIG. 1, electronic devices such as electronic device 106 and electronic device 105 may communicate directly over a secure direct connection in some scenarios, such as when electronic device 106 is in proximity to electronic device 105. Although the electronic devices 102-107 are depicted in FIG. 1 as forming a part of a connected home environment in which all of the devices are connected to the LAN 108, one or more of the electronic devices 102-107 may not be a part of the connected home environment and/or may not be connected to the LAN 108 at one or more times.

In one or more implementations, the LAN 108 may include one or more different network devices/network medium and/or may utilize one or more different wireless and/or wired network technologies, such as Ethernet, optical, Wi-Fi, Bluetooth, Zigbee, Powerline over Ethernet, coaxial, Ethernet, Z-Wave, cellular, or generally any wireless and/or wired network technology that may communicatively couple two or more devices.

In one or more implementations, the network 110 may be an interconnected network of devices that may include, and/or may be communicatively coupled to, the Internet. For explanatory purposes, the network environment 100 is illustrated in FIG. 1 as including electronic devices 102-107, and the servers 112-114; however, the network environment 100 may include any number of electronic devices and any number of servers.

One or more of the electronic devices 102-107 may be, for example, a portable computing device such as a laptop computer, a smartphone, a smart speaker, a peripheral device (e.g., a digital camera, headphones), a digital media player, a tablet device, a wearable device such as a smartwatch or a band, a connected home device, such as a wireless camera, a router and/or wireless access point, a wireless access device (e.g., a door lock), a smart thermostat, smart light bulbs, home security devices (e.g., motion sensors, door/window sensors, etc.), smart outlets, smart switches, and the like, or any other appropriate device that includes and/or is communicatively coupled to, for example, one or more wired or wireless interfaces, such as WLAN radios, cellular radios, Bluetooth radios, Zigbee radios, near field communication (NFC) radios, and/or other wireless radios.

By way of example, in FIG. 1 each of the electronic devices 102-103 is depicted as a smart speaker, the electronic device 106 is depicted as a smartphone, the electronic device 107 is depicted as a smartwatch, and each of the electronic devices 104 and 105 is depicted as a digital media player (e.g., configured to receive digital data such as music and/or video and stream it to a display device such as a television or other video display). In one or more implementations, one or more of the electronic devices 104 and 105 may be integrated into or separate from a corresponding display device. One or more of the electronic devices 102-107 may be, and/or may include all or part of, the device discussed below with respect to FIG. 2, and/or the electronic system discussed below with respect to FIG. 9.

One of more of the electronic devices 102-107 may be configured to receive user authorization to access respective user account profiles for single user accounts and/or group accounts, in order to provide access to content, applications, services, or storage within the connected home environment 116, and/or with servers 112-114.

In one or more implementations, the electronic device 106 may correspond to a personal device associated with a user account (e.g., of a user named "Alison"). Alison may reside in or be a guest of the home/residence (e.g., corresponding to the connected home environment 116), which is the home of another user (e.g., named "Bob"). The electronic device 107 may also be associated with a user account for Allison, and the electronic devices 102-104 may correspond to an account such as a home account or a cloud-based account for Bob. In an example, the electronic device 105 may also correspond to the user account of Alison. For example, the respective users may register and/or associate their respective electronic devices 102-106 to their respective user accounts, through a service provider, such as through the cloud-based service 114.

In one or more implementations, Bob may interact with the electronic device 104 in order to access and/or output content (e.g., video and/or music available through Bob's content library associated with Bob's user account) on one or more of the electronic devices 102-104. For example, the electronic devices 102-103 (e.g., smart speakers) may have a virtual assistant application running thereon, and Bob may provide a voice request to stream music (e.g., via the content provider 112) in association with his user account.

Alison may access her media content (e.g., music and/or video) on one or more of the electronic devices 105-107. For example, the electronic device 105 (e.g., a digital media player) may have a remote control device that Alison can use (e.g., via physical button(s), touch surface(s), and/or voice requests spoken to the remote) to control output of video and/or music via the content provider 112 in association with her user account.

In one or more implementations, the cloud-based service 114 may be configured to perform operations in association with user accounts such as: storing data (e.g., voice profiles, user settings/preferences, files such as documents and/or photos, etc.) with respect to user accounts, sharing and/or sending data with other users with respect to user accounts, backing up device data with respect to user accounts, and/or associating devices and/or groups of devices with user accounts.

One or more of the servers for content provider 112 and/or cloud-based service 114 may be, and/or may include all or part of the device discussed below with respect to FIG. 2, and/or the electronic system discussed below with respect to FIG. 9. Each of the content provider 112 and/or cloud-based service 114 may include one or more servers, such as a cloud of servers. For explanatory purposes, a single server is shown and discussed with respect to various operations for each of the content provider 112 and/or cloud-based service 114. However, these and other operations discussed herein may be performed by one or more servers, and each different operation may be performed by the same or different servers.

Figure 2:
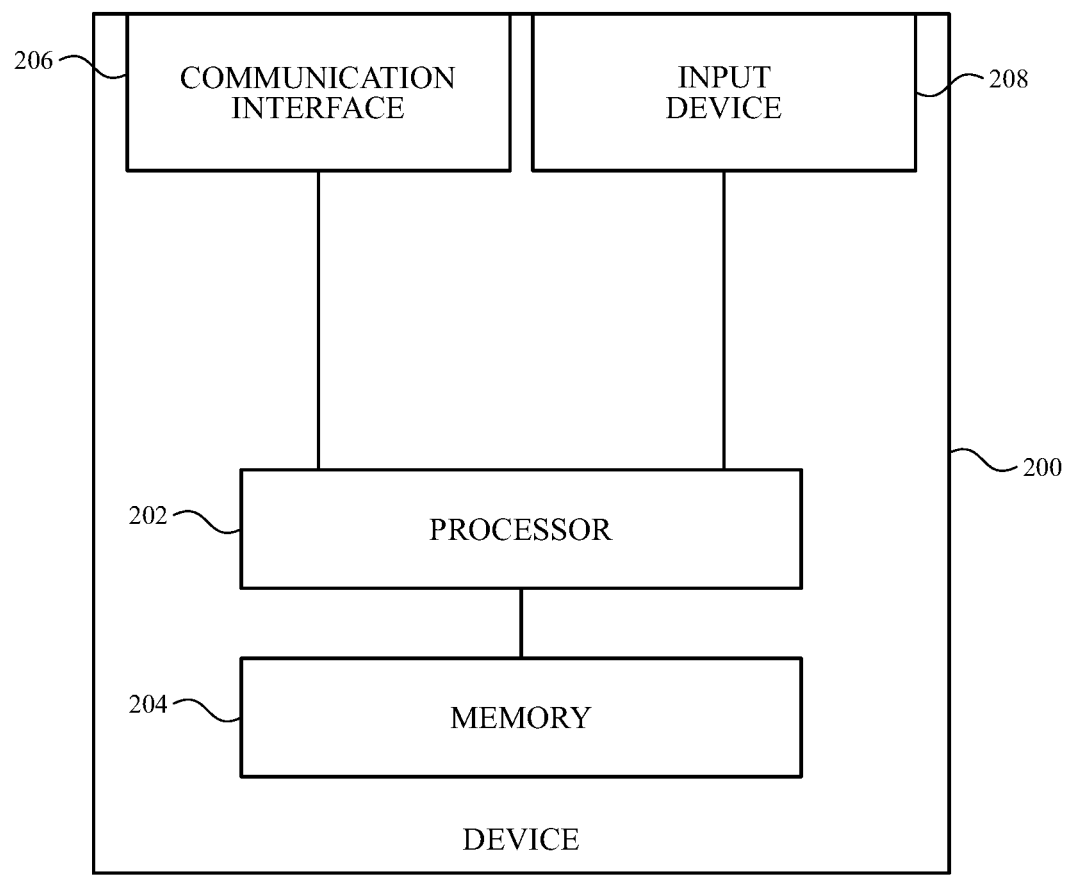
FIG. 2 illustrates an example device that may implement a system for companion device authentication in accordance with one or more implementations.

FIG. 2 illustrates an example device that may implement a system for companion device authentication in accordance with one or more implementations. For example, the device 200 of FIG. 2 can correspond to any of the electronic devices 102-107 and/or the servers of content provider 112 and/or cloud-based service 114 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, a communication interface 206 and an input device 208. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, in a case where the device 200 corresponds to one of the electronic devices 102-107, the memory 204 may store authentication information associated with one or more user accounts for one or more applications and/or services, using data stored locally in memory 204. Moreover, the input device 208 may include suitable logic, circuitry, and/or code for capturing input, such as audio input (e.g., voice requests), remote control input, touchscreen input, keyboard input, etc.

The communication interface 206 may include suitable logic, circuitry, and/or code that enables wired or wireless communication, such as between any of the electronic devices 102-107 and/or the servers 112-114 over the network 110 (e.g., in conjunction with the LAN 108). The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 202, the memory 204, the communication interface 206, the input device 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
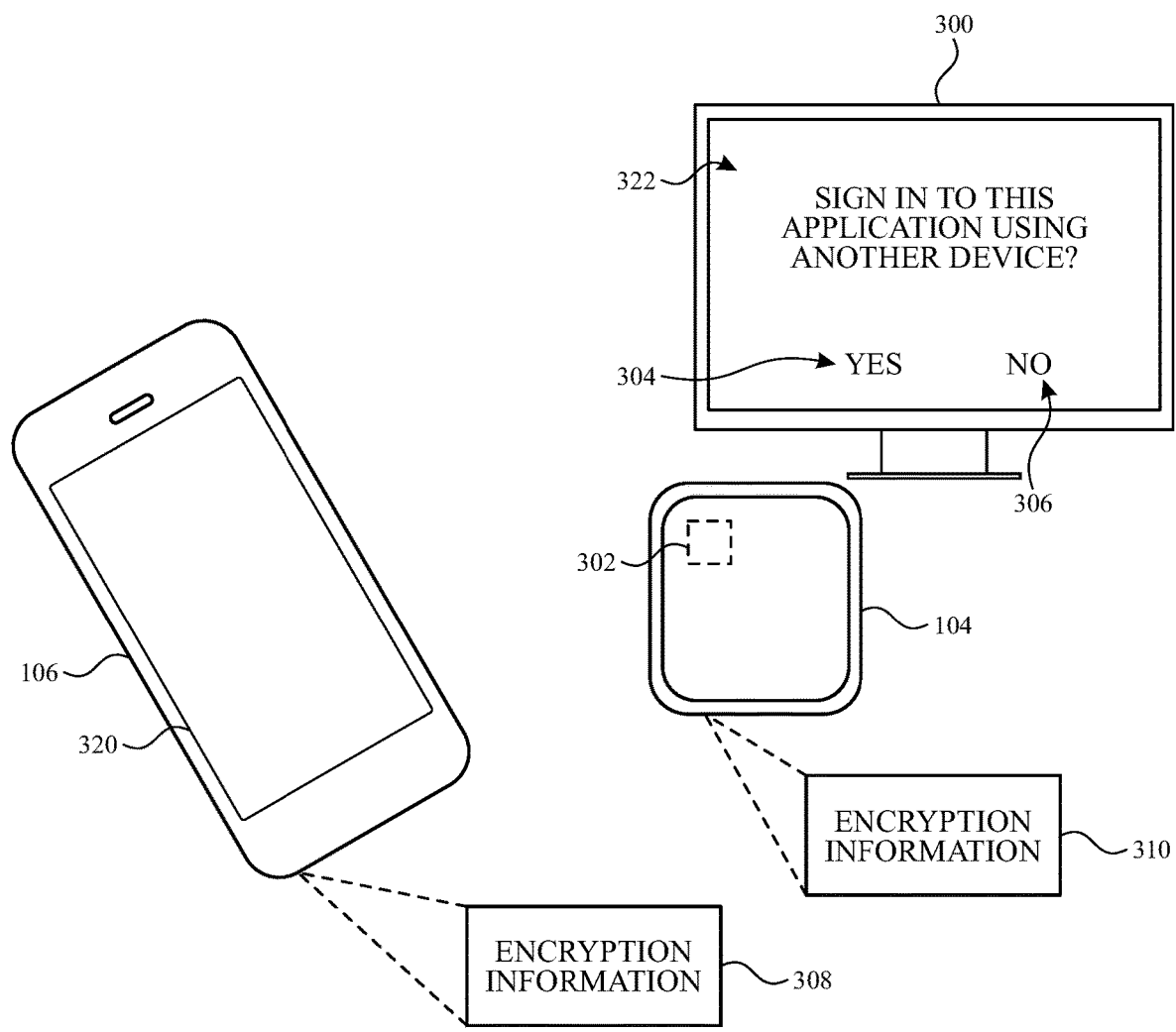
FIG. 3 illustrates an electronic device and a companion electronic device in accordance with one or more implementations.

FIG. 3 illustrates an example in which electronic device 106 is in proximity to electronic device 104 at a time when access to content or a service, such as access to content provider 112 via an application 302 running at electronic device 104, has been initiated. For example, a user of electronic device may have launched the application 302 at electronic device 104, at a time when the user of the electronic device 104 is not logged into the application 302.

As illustrated in FIG. 3, responsive to launching the application 302 when a user is not logged into the application 302, a system process that is separate from the application 302 may provide a notification 322, such as using a display 300 that is connected to or is integral with the electronic device 104. As shown in FIG. 3, electronic device 104 may have previously stored encryption information 310 that can be used for establishing a secure direct connection (e.g., a secure direct peer-to-peer channel) with electronic device 106. FIG. 3 also shows how electronic device 106 may have previously stored encryption information 308 that can be used for establishing a secure direct connection with electronic device 104. For example, the electronic device 104 and the electronic device 106 may have previously exchanged the encryption information 308 and 310 (e.g., public keys, link keys, or the like) as part of a prior pairing operation, or as part of registration operations to register the devices as devices of members of a family or a home. In one or more implementations, the encryption information 308 and/or 310 may have been exchanged by the electronic devices 104 and 106 via a direct peer-to-peer connection between the electronic devices 104 and 106 and/or the encryption information 308 and/or 310 may have been exchanged by the electronic devices 104 and 106 via a server-based transport mechanism.

For example, electronic device 104 may have previously paired with electronic device 106 and exchanged encryption information that can be stored for later establishment of a secure direct connection. In another example, electronic device 106 may be a device that is associated with the user account for the electronic device 104 (e.g., electronic device 104 and electronic device 106 may be registered devices of the same user). In another example, the electronic device 106 may be a device associated with its own user account that is different from but associated with an account of the electronic device 104 (e.g., and electronic device 106 may be a device that is registered as a family member device of a family member of the user of electronic device 104, or a device of another user that is associated with a home environment of the user of electronic device 104).

In the example, of FIG. 3, the display 320 of electronic device 106 is inactive, and a notification 322 provided by electronic device 104 includes a request to a user to indicate whether authentication (sign-in) to the application 302 using another device is desired. In the example of FIG. 3, the notification 322 includes a selectable option 304 (e.g., "Y") to request companion device authentication, and a selectable option 306 (e.g., "N") to decline companion device authentication. However, selectable options 304 and 306 are merely illustrative, and other or different selectable options can be provided for requesting companion device authentication.

Figure 4:
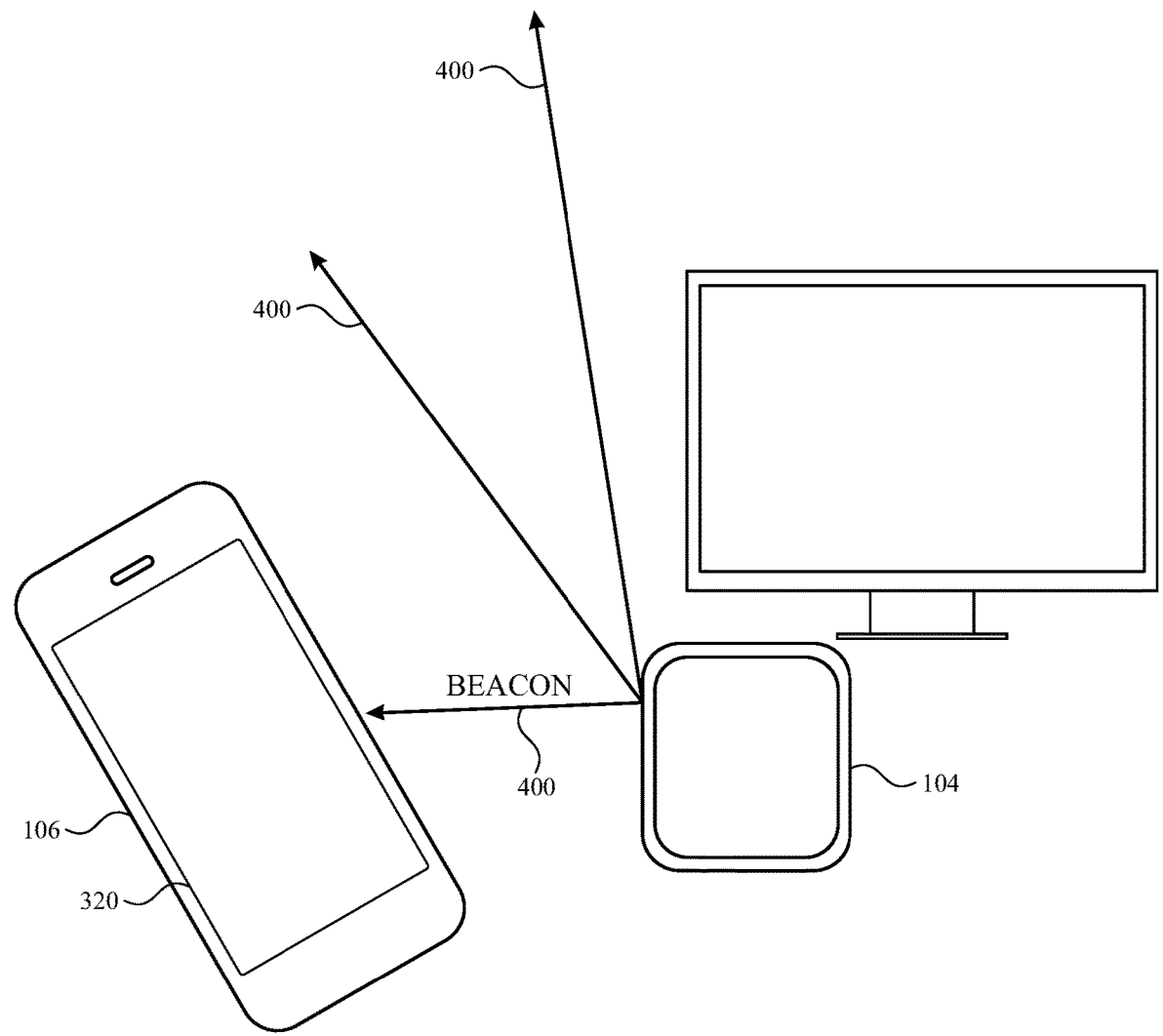
FIG. 4 illustrates an electronic device providing a beacon to an inactive companion electronic device in accordance with one or more implementations.

FIG. 4 illustrates an example of the electronic device 106 and the electronic device 104 after a user of the electronic device 104 has requested companion device authentication (e.g., by selecting the selectable option 304 of FIG. 3). As shown in FIG. 4, responsive to the request at electronic device 104, electronic device 104 (e.g., a system process at electronic device 104) broadcasts a beacon 400 to any electronic devices that are in proximity to the electronic device 104. As shown in FIG. 4, while the beacon 400 is being broadcast by electronic device 104, the display 320 of electronic device 106 is still inactive (or active and free of any notification associated with the beacon), and electronic device 106 does not provide any external notification (e.g., buzzing, audio output, or visual output) responsive to the beacon.

Because the user of electronic device 106 is aware that they (or another user) has requested companion device authentication at electronic device 104, the user of electronic device 106 may pick up and/or unlock the electronic device 106 to provide the companion device authentication (e.g., before any notification has been provided at the electronic device 106). In this way, user input can be provided to the electronic device 106 to nominate the electronic device 106 (e.g., as an authentication device) to provide the companion device authentication. User input to the electronic device 106 (e.g., to indicate a nomination) can be active user input (e.g., pressing a button or providing touchscreen input), or passive user input (e.g., lifting the device).

Figure 5:
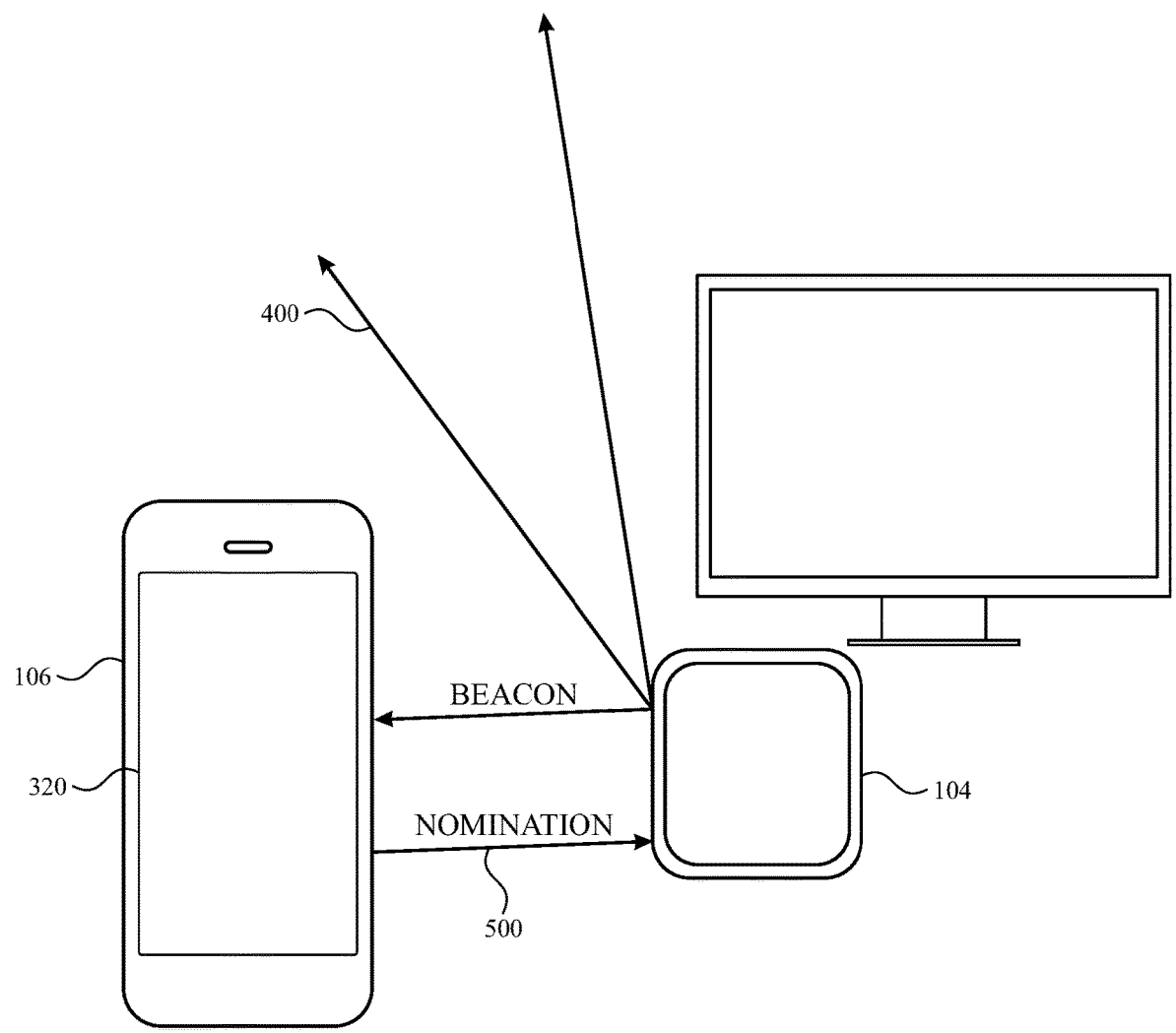
FIG. 5 illustrates an electronic device receiving a nomination from a companion electronic device in accordance with one or more implementations.

As illustrated in FIG. 5, responsive to being picked up (e.g., as sensed using an accelerometer or other inertial measurement unit (IMU) component in the electronic device 106), and/or unlocked, the electronic device 106 (e.g., still without activating the display 320 or otherwise providing an external notification, and without user instructions) provides a nomination signal 500 to the electronic device 104, the nomination signal nominating the electronic device 106 to provide the companion device authentication.

Figure 6:
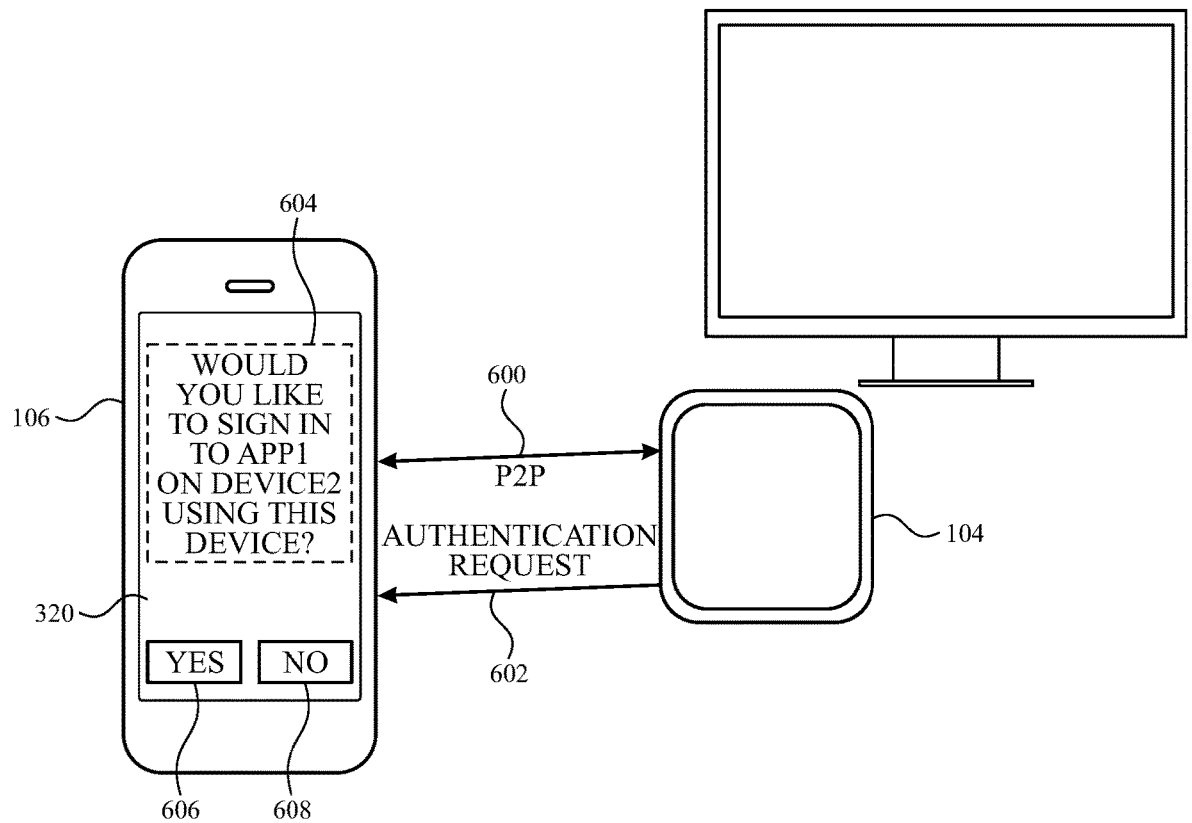
FIG. 6 illustrates a companion electronic device with a display that has been activated responsive to an authentication request from an electronic device in accordance with one or more implementations.

As illustrated in FIG. 6, responsive to receiving the nomination signal 500, electronic device 104 discontinues broadcasting the beacon, and establishes a secure direct connection 600 (e.g., a secure direct peer-to-peer channel) with the electronic device 106 (e.g., using the encryption information 308 and 310 discussed above in connection with FIG. 3). FIG. 6 also illustrates how, once the secure direct connection 600 is established, the electronic device 104 provides an authentication request 602 to the electronic device 106. As illustrated in FIG. 6, because the authentication request 602 is provided over a secure direct connection 600, the authentication request 602 can include sufficient information to allow an initial notification 604 provided by the electronic device 106 to include meaningful information for the user about the companion device authentication request (e.g., including the application and the device for which the companion device authentication is desired).

For example, in FIG. 6, the initial notification 604 includes the text "Would you like to sign in to App1 on Device2, using this device?". In this example, "App1" may represent a title or name of the application (e.g., application 302) for which authentication is being requested by "Device2", which corresponds to the electronic device 104 in this example. In the example of FIG. 6, the initial notification includes a selectable option 606 (e.g., "YES") to proceed with companion device authentication, and a selectable option 608 (e.g., "NO") to decline companion device authentication. However, other or different selectable options can be provided for continuation with (acceptance of) or declining companion device authentication.

Depending on the configuration of electronic device 106, the state of electronic device 106, and/or access permissions held by electronic device 106, continuing with the companion device authentication can be performed in various ways.

For example, in one or more implementations, electronic device 106 may have a token for authentication with application 302, content provider 112, and/or cloud-based service 114 stored in memory, that can be transferred to the electronic device 104 to allow the electronic device to authenticate with application 302, content provider 112, and/or cloud-based service 114. In one or more implementations, in order to authorize the transfer of the token, the user of the electronic device 106 may be required to provide an unlock passcode, a biometric authentication, or other local authentication that is used to access the electronic device 106.

In another example, in one or more implementations, electronic device 106 may securely store a password that is used for access to the application 302, content provider 112, and/or cloud-based service 114 at the electronic device 106. In this example, (e.g., following user authentication for access to the stored password, such as using a device unlock code or a biometric authentication), the electronic device 106 can provide the stored password to the electronic device 104 over the secure direct connection 600 to be used for authentication of a user account for the application 302, content provider 112, and/or cloud-based service 114 at the electronic device 104.

In another example, in one or more implementations, continuing with the companion device authentication with electronic device 106 may include redirecting the user of the electronic device 106 to a webpage for the application 302, content provider 112, and/or cloud-based service 114 (e.g., using a browser of the electronic device 106). In this example a physical or virtual keyboard and/or other input component of the electronic device 106 may be used to manually enter authentication information to the webpage, for access to the application 302, content provider 112, and/or cloud-based service 114 by the electronic device 104. For example, once the user of the electronic device 106 provides the authentication information via the webpage, a server associated with the webpage may authorize the electronic device 104 to access the application 302, content provider 112, and/or cloud-based service 114.

In accordance with one or more aspects, the systems and methods disclosed herein provide the ability of the companion device (also referred to herein as an authentication device) to provide a meaningful initial notification to a user by receiving information via a secure channel (after nominating itself), and by waiting to provide the initial notification on the companion device until the user provisionally "nominates" the device to receive the notification (e.g., by picking up the device or turning on the display).

In accordance with one or more aspects, the systems and methods disclosed herein may also allow relay operations between multiple companion devices, such as a smartphone and a smart watch, to allow the smart watch to serve as the authentication device that provides companion device authentication via the smart phone.

Although a single companion device is shown in the examples of FIGS. 3-6 in proximity to the electronic device 104, one or more additional devices may also be in proximity to electronic device 104, and receive the beacon 400. These additional devices may include devices that are eligible to provide companion device authentication (e.g., previously paired devices, family or home member devices, devices on the same network as the electronic device, or other devices registered to the same user as the user or primary user of the electronic device 104), and/or devices that are ineligible to provide companion device authentication (e.g., devices of other users that have not previously paired with the electronic device 104, that are not connected to the same wireless network, and/or that have not been registered as devices of family or home members).

Although eligible and ineligible devices can receive the beacon 400 (e.g., and nominate themselves in some implementations), because the electronic device 104 does not have encryption information for establishing a secure direct connection with the ineligible devices, the electronic device 104 will be unable to provide a companion device authentication request to the ineligible device. In this way, the ineligible devices are prevented from receiving any information indicating activity at the electronic device 104 (e.g., because the beacon is a generic beacon that does not include specific information about the request, the application, or the device), and the ineligible devices also do not waste power and computing resources generating notifications of a request from the electronic device 104.

Figure 7:
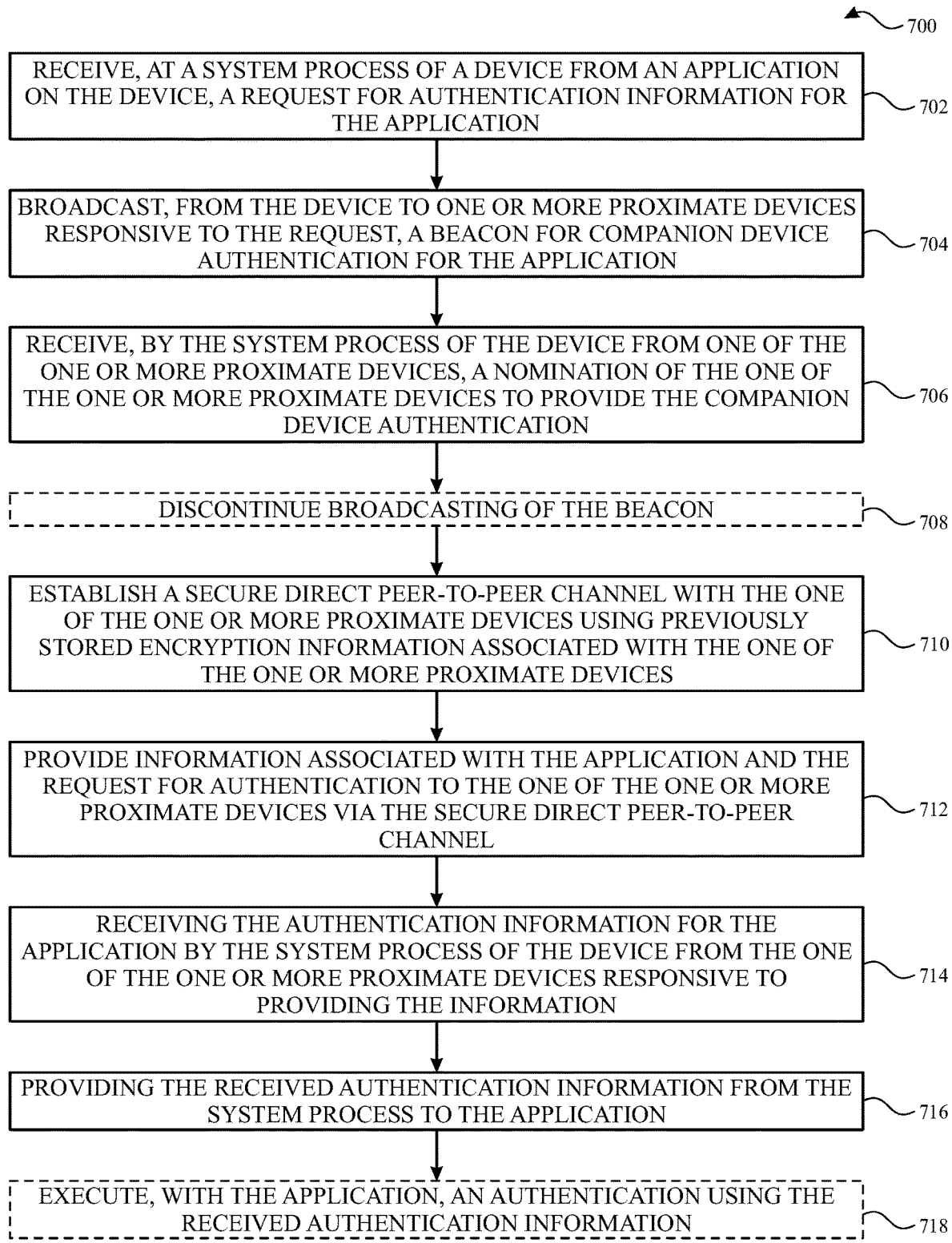
FIG. 7 illustrates a flow diagram of an example process that can be performed by an electronic device for companion device authentication in accordance with one or more implementations.

FIG. 7 illustrates a flow diagram of an example process 700 for performing companion device authentication in accordance with one or more implementations. For explanatory purposes, the process 700 is primarily described herein with reference to the electronic device 104, the electronic device 106, the content provider 112, and the cloud-based service 114 of FIGS. 1 and 2. However, the process 700 is not limited to the electronic device 104, the electronic device 106, the content provider 112, and the cloud-based service 114 of FIGS. 1 and 2, and one or more blocks (or operations) of the process 700 may be performed by one or more other suitable devices and/or for authentication with other devices or services. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

At block 702, a system process of a device (e.g., electronic device 104) receives, from an application (e.g., application 302) on the device, a request for authentication information for the application. The application may be, for example, associated with a content provider (e.g., content provider 112) or a cloud-based service (e.g., cloud-based service 114).

At block 704 the device may broadcast, to one or more proximate devices responsive to the request, a beacon (e.g., beacon 400) for companion device authentication for the application. In one or more implementations, the beacon may be free of information that identifies the application or the device.

At block 706 the system process of the device may receive, from one of the one or more proximate devices, a nomination (e.g., a nomination signal 500) of the one of the one or more proximate devices (e.g., electronic device 106) to provide the companion device authentication.

Responsive to receiving the nomination, the device may, at optional block 708, discontinue broadcasting of the beacon, establish, at block 710, a secure direct peer-to-peer channel (e.g., secure direct connection 600) with the one of the one or more proximate devices using previously stored encryption information (e.g., encryption information 308 and/or 310 as described above in connection with FIG. 3) associated with the one of the one or more proximate devices, and, provide, at block 712, information associated with the application (e.g., a name or title of the application) and the request for authentication (e.g., authentication request 602) to the one of the one or more proximate devices via the secure direct peer-to-peer channel. For example, in one or more implementations, prior to the request for the authentication information the device may pair with the one of the one or more proximate devices, and store the encryption information associated with the one of the one or more proximate devices based on the pairing.

In various implementations, the one of the one or more proximate devices may be a device of a registered member of the home of the user of the device, a registered member of a family of the user of the device, another device of the user of the device, or a device that has previously paired with the device. For example, the device may be a device of a first user, and the other device may be a device associated with a member of a family of the first user or a home of the first user.

At block 714, the system process of the device may receive the authentication information (e.g., a token, a password, or other authentication information) for the application from the one of the one or more proximate devices responsive to providing the information. In one or more implementations, the device is associated with a first user account (e.g., a first user account of a user of the device), and the authentication information is associated with a second user account (e.g., a second user account of a user of the one of the one or more proximate devices). For example, the first user account may be an account with a cloud-based service (e.g., a cloud-based service 114), and the second user account may be an account with a content provider. In one or more implementations, the user of the one of the one or more proximate devices may also have an account (e.g., a third account) with the cloud-based service. The one or more proximate devices and/or another device may be logged into and/or registered with the account (e.g., the third account) with the cloud-based service.

At block 716, the received authentication information may be provided from the system process to the application. The authentication information may include, as examples, a token, or a password that can be used by the other device for authentication of a user account of the application.

At optional block 718, the application may execute an authentication using the received authentication information. Executing the authentication may include, for example, providing the authentication information received from the other device to a server associated with the application (e.g., content provider 112 and/or cloud-based service 114). Once the information is authenticated, the application may then provide access to content and/or services according to the authentication.

Figure 8:
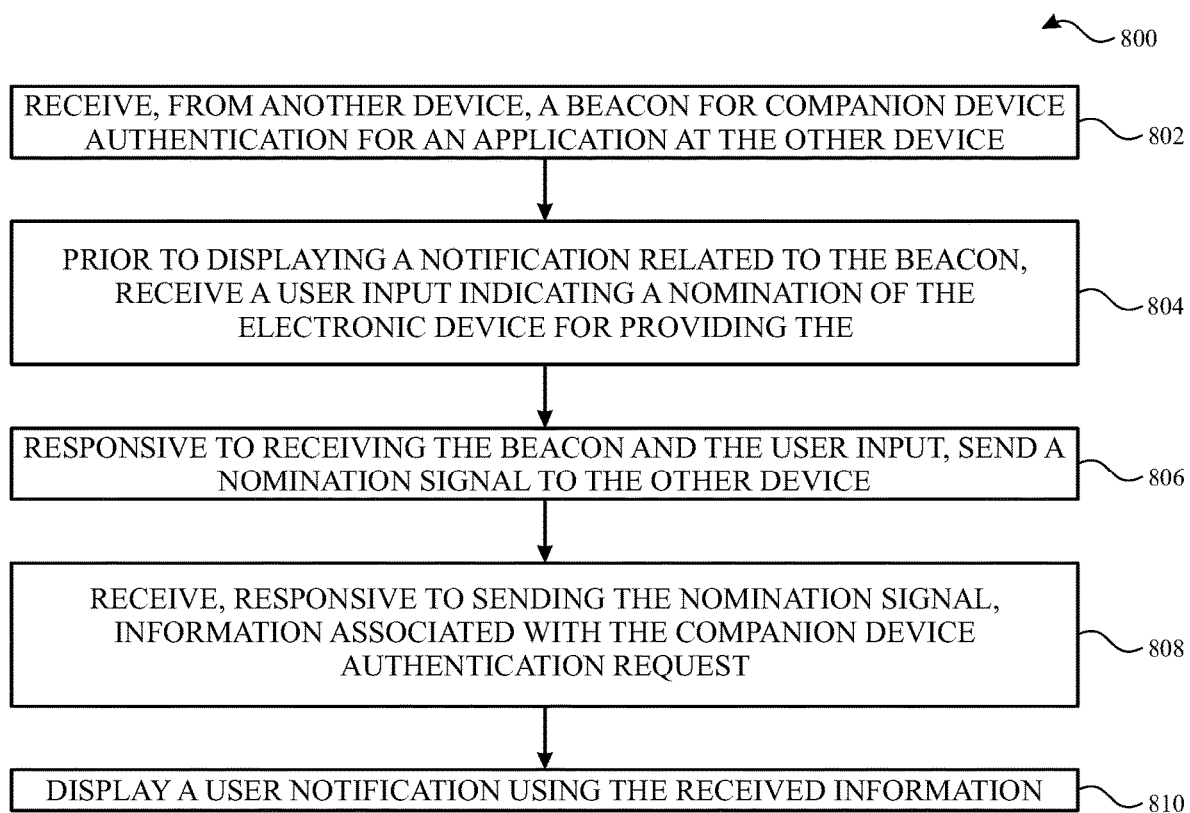
FIG. 8 illustrates a flow diagram of an example process that can be performed by a companion electronic device for companion device authentication in accordance with one or more implementations.

FIG. 8 illustrates a flow diagram of an example process 800 for performing companion device authentication at an authentication device in accordance with one or more implementations. For explanatory purposes, the process 800 is primarily described herein with reference to the electronic device 104, the electronic device 106, the content provider 112, and the cloud-based service 114 of FIGS. 1 and 2. However, the process 800 is not limited to the electronic device 104, the electronic device 106, the content provider 112, and the cloud-based service 114 of FIGS. 1 and 2, and one or more blocks (or operations) of the process 800 may be performed by one or more other suitable devices and/or for authentication with other devices or services. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

At block 802, an electronic device (e.g., electronic device 106) receives, from another device (e.g., electronic device 104), a beacon (e.g., beacon 400) for companion device authentication for an application (e.g., application 302) at the other device. In one or more implementations, the electronic device does not have local access to the application (e.g., because the application is not installed or is not updated at the electronic device).

At block 804, prior to displaying a notification related to the beacon, the electronic device receives a user input indicating a nomination of the electronic device for providing the companion device authentication. The user input may include a movement of the device (e.g., due to the user picking up the device or raising the device for viewing, as indicated by motion sensor such as an IMU of the device), an unlocking of the device, or other active or passive user input to the device before any external notification of the beacon is provided for the user. For example, the user input may be a movement of the electronic device prior to the display of the user notification.

At block 806, responsive to receiving the beacon and the user input, the electronic device may send a nomination signal (e.g., nomination signal 500) to the other device. The electronic device may then establish a secure direct connection with the other device.

At block 808, the electronic device may receive, responsive to sending the nomination signal (e.g., and via the secure direct connection), information associated with the companion device authentication request. For example, the information may be received in an authentication request such as authentication request 602 of FIG. 6. As described above in connection with, for example, FIG. 6, the authentication request may include information for providing a meaningful notification to the user of the electronic device, such as a name or title of the application for which authentication is desired, and/or an identifier of the other device. In one or more implementations, receiving the information associated with the companion device authentication may include receiving the information in a companion device authentication request At block 810, the electronic device may display a user notification (e.g., initial notification 604) using the received information. For example, the user notification includes a name or a title of the application at the other device and an identifier of the other device.

In one or more implementations, after displaying the user notification, the electronic device may receive a user input indicating acceptance of the companion device authentication request. The electronic device may then obtain authentication information stored at the electronic device, and provide the authentication information to the other device. For example, the electronic device may be associated with a first user account (e.g., a first user account of a first user), and the other device may be associated with a second user account (e.g., a second user account of a second user). In one or more implementations, the authentication information may include a token corresponding to the first user account of the first user. In one or more implementations, the authentication information may include a password. For example, the authentication information may include a password associated with a third user account of the first user, the third user account associated with a content provider. In one or more other implementations, the electronic device may provide a redirect to a webpage for the companion device authentication (e.g., when the electronic device does not have a token or a password that can provide authentication for the application stored locally at the electronic device).

Various examples are described in connection with FIGS. 3-8 in which a companion device is used to provide authentication operations for login or sign-in of another device to an account or a service. However, as described herein, companion device approval and/or authentication can also be provided for approval processes such as for approval of purchases, approval to download and/or install applications and/or other software, approval of Terms and Conditions, and/or other approval processes, by the subject technology.

Figure 9:
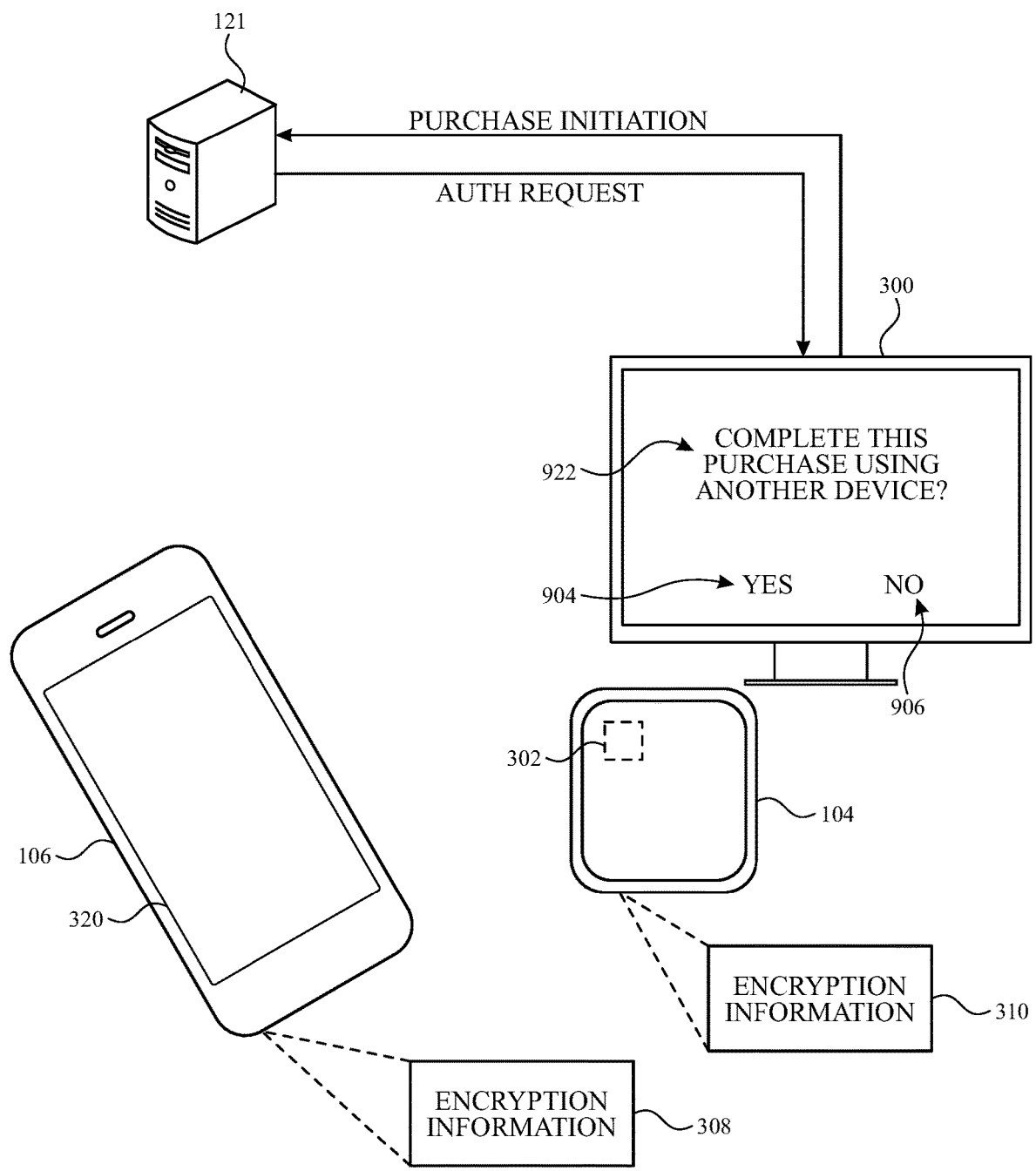
FIG. 9 illustrates an electronic device initiating a purchase approval in accordance with one or more implementations.

For example, FIG. 9 illustrates an example in which electronic device 106 is in proximity to electronic device 104 at a time when a user is attempting to perform a purchase using the electronic device 104. For example, the user may be attempting to rent a movie for streaming with the electronic device 104, attempting to purchase a game or an application for the electronic device 104, or attempting to make any other purchase (e.g., an in-app purchase) using the electronic device 104. In the example of FIG. 9, the purchase has been initiated by the user at electronic device 104. For example, a user of electronic device 104 may have selected a movie for purchase or rental at electronic device 104, at a time when the user of the electronic device 106 is the current user of the electronic device 104.

As illustrated in FIG. 9, responsive to initiating the purchase at electronic device 104, the electronic device 104 may initiate the purchase with a merchant service, such as the merchant server 121. The merchant server 121 may provide an authorization request (e.g., a cryptographic challenge) for the purchase to the electronic device 104. In one or more implementations, the merchant server 121 may determine, based on the purchase initiation, that that the electronic device 104 is eligible for delegate authorization of the purchase. For example, the merchant server 121 may notify the electronic device 104 (e.g., with information included with the authorization request) that delegate authorization is an option for completing the purchase.

As shown, the electronic device 104 may provide a notification 922, such as using a display 300 that is connected to or is integral with the electronic device 104. As shown in FIG. 9, electronic device 104 may have previously stored encryption information 310 that can be used for establishing a secure direct connection (e.g., a secure direct peer-to-peer channel) with electronic device 106. FIG. 9 also shows how electronic device 106 may have previously stored encryption information 308 that can be used for establishing a secure direct connection with electronic device 104. For example, prior to initiation of the purchase at the electronic device 104, the electronic device 104 and the electronic device 106 may have previously exchanged and stored the encryption information 308 and 310 (e.g., public keys, link keys, or the like) that can be later used to establish a secure direct peer-to-peer channel. For example, the encryption information 308 and 310 may have previously been exchanged as part of a prior pairing operation, or as part of registration or sign-in operations to register or sign-in the devices into a common user account and/or as devices of members of a family or a home. In one or more implementations, the encryption information 308 and/or 310 may have been exchanged by the electronic devices 104 and 106 via a direct peer-to-peer connection between the electronic devices 104 and 106 and/or the encryption information 308 and/or 310 may have been exchanged by the electronic devices 104 and 106 via a server-based transport mechanism.

For example, electronic device 104 may have previously paired with electronic device 106 and exchanged encryption information that can be stored for later establishment of a secure direct connection. In another example, electronic device 106 may be a device that is associated with the user account of the current user of the electronic device 104 (e.g., electronic device 104 and electronic device 106 may be registered devices of the same user and, if one or more of electronic device 106 and electronic device 104 are multi-user devices, the same user may be the current user of both devices).

In the example, of FIG. 9, the display 320 of electronic device 106 is inactive, and a notification 922 provided by electronic device 104 includes a request to a user to indicate whether approval of the purchase using another device (e.g., companion devices approval) is desired. In the example of FIG. 9, the notification 922 includes a selectable option 904 (e.g., "YES") to request companion device purchase approval, and a selectable option 906 (e.g., "NO") to decline companion device purchase approval. However, selectable options 904 and 906 are merely illustrative, and other or different selectable options can be provided for requesting companion device purchase approval. Additional options for completing the purchase using only the electronic device 104 (e.g., by entering a password directly to the electronic device 104) may also be included or with the notification 922, in one or more implementations.

Figure 10:
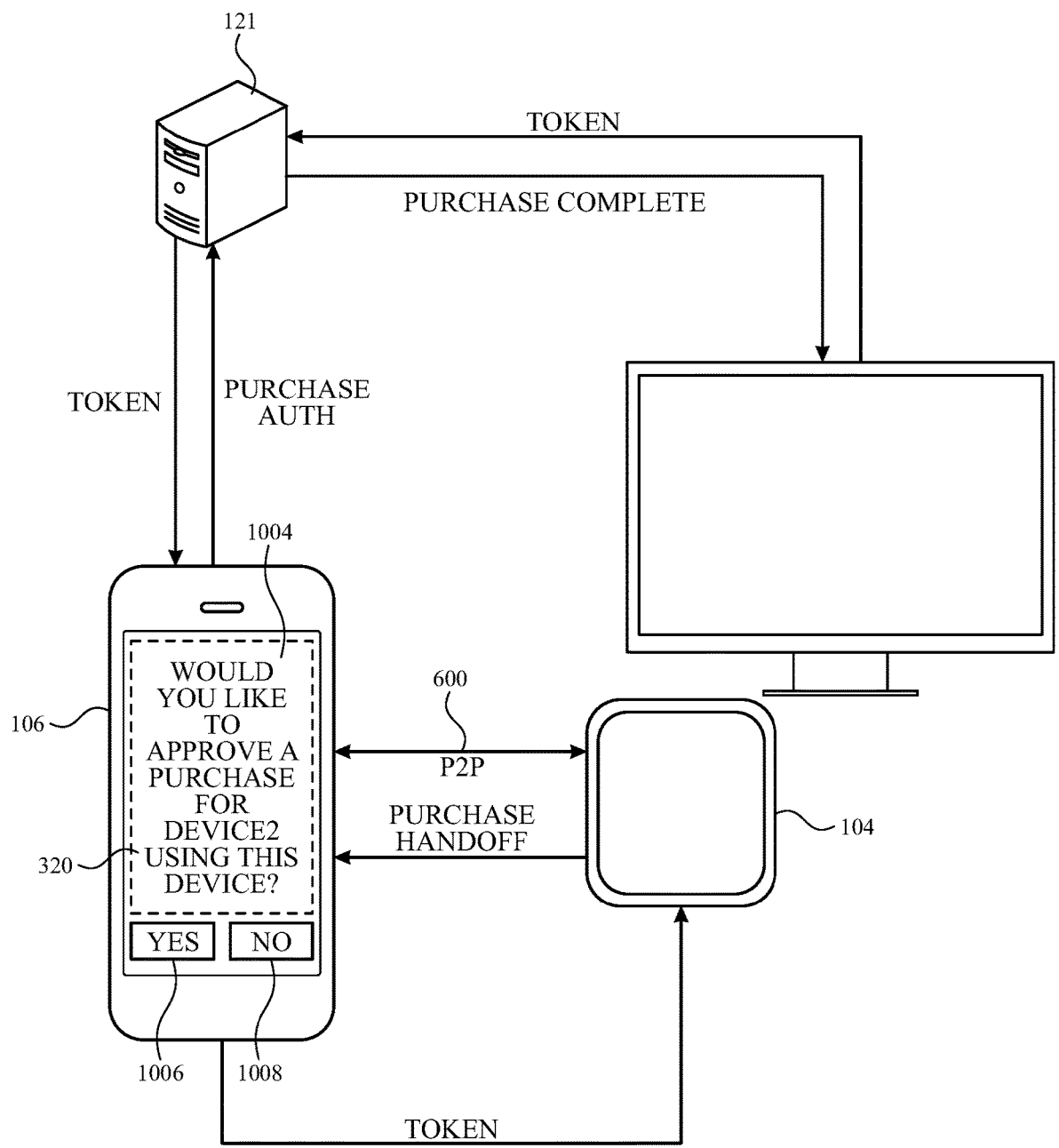
FIG. 10 illustrates an electronic device and a companion electronic device performing a companion device purchase approval in accordance with one or more implementations.

FIG. 10 illustrates an operational scenario in which, responsive to receiving a user input (e.g., a selection of the selectable option 904) indicating that companion device authorization of the purchase is desired, the electronic device 104 may provide a purchase handoff to the electronic device 106 (e.g., over a secure direct peer-to-peer connection 600 established as discussed above in connection with FIG. 6). The purchase handoff may be or include a request for companion device approval that is provided to any or all electronic devices that are in proximity of the electronic device 104 and/or that are associated with the same user (e.g., proximate electronic devices that are logged into the same user account as the user account of the current user of the electronic device 104). For example, in one or more implementations, the electronic device 104 may have multiple registered users, and the purchase handoff may be provided only to the electronic devices of a current one of the multiple users, and not to any devices of any other users of the electronic device 104 (e.g., even if devices of other users of the electronic device 104 are in proximity to and/or paired with the electronic device 104). In this way, the purchase handoff for a purchase by a user can include information identifying the purchase without exposing any personal user information associated with the purchase to any devices other than the devices of the user. As other examples, in one or more implementations, the request may be provided to any proximate device, any previously paired proximate device, any proximate device associated with a same user account as any profile on the electronic device 104, any proximate device in the same group (e.g., family) as the current profile on the electronic device 104, and/or any other devices that are associated with and/or proximate to the electronic device 104.

As indicated in FIG. 10, responsive to receiving the purchase handoff from the electronic device 104, the electronic device 106 may provide a notification 1004 (e.g., using display 320) that includes the text "Would you like to Approve a Purchase for Device2 using this Device?". In this example, "Device2" corresponds to the electronic device 104. The purchase handoff may include information associated with the purchase, such as a name of an application at the electronic device 104 within which the purchase is being initiated, and/or other metadata for the purchase. For example, for the purchase operation illustrated in FIGS. 9 and 10, the purchase handoff may include a price of the purchase, an age rating associated with the purchase, a title of the purchase, and/or other metadata associated with the purchase. The notification 1004 may also include some or all of the metadata, such as information identifying the purchase and/or an amount of the purchase, as received in the purchase handoff from the electronic device 104. In the example of FIG. 10, the notification 1004 includes a selectable option 1006 (e.g., "YES") to proceed with companion device purchase approval, and a selectable option 1008 (e.g., "NO") to decline companion device purchase approval. However, other or different selectable options can be provided for continuation with (acceptance of) or declining companion device purchase approval.

In one or more implementations, in order to complete the selection of the selectable option 1006 to proceed with companion device approval (e.g., in order to perform a delegate authentication operation to answer the cryptographic challenge provided from server 121 to electronic device 104 and handed off from electronic device 104 to electronic device 106), the electronic device 106 may request user authentication at the electronic device 106 (e.g., in circumstances in which the electronic device 106 is locked at the time that the purchase handoff is received). For example, responsive to receiving a selection of the selectable option 1006 (or prior to receiving the selection in other circumstances, such as when the device is unlocked for another reason prior to receiving the purchase handoff) the electronic device 106 may provide options for the user to provide biometric authenticating information (e.g., a fingerprint or a facial scan) and/or to provide a passcode for the electronic device 106 in order to unlock the electronic device 106 to proceed with the companion device approval at the electronic device 106.

Responsive to an acceptance of the option (e.g., selectable option 1006) to proceed with the companion device purchase approval and/or in response to receipt of the authentication information for access to the electronic device 106, the electronic device 106 may provide a purchase authorization (e.g., including an indication of the approval and/or including user authentication information) to the merchant server 121 following authentication of the user at the electronic device 106. In one or more implementations, the electronic device 106 may leverage the same previously attainted authorization information (e.g., biometric information or passcode information) that has been established on that device (e.g., to unlock the device) to authenticate the user as authorized to make purchases with the electronic device 106. In one or more other implementations, the electronic device 106 may require an additional authentication of the user prior to providing the purchase authorization to the merchant server 121. For example, the user of electronic device 106 may provide a password for a user account, may enter new payment information, or may (e.g., again) provide other authenticating information such as biometric authenticating information (e.g., a fingerprint or a facial scan) to authenticate the user as authorized to make purchases with the electronic device 106. For example, in various operational scenarios, user account settings and/or user device settings may determine whether authenticating information that unlocks the device is sufficient to authorize purchases and/or whether other authentication information or re-input of the previous authentication information is required for each new purchase or for purchases initiated after a period of time since a last purchase authorization. Once the user authentication is received at the electronic device 106, the electronic device 106 may provide the purchase authorization to the merchant server 121, and the merchant server may return a token (e.g., a delegate token) for the purchase to the electronic device 106 (e.g., after processing a payment for the purchase with a payment server).

The electronic device 106 may then provide the token for the purchase to the electronic device 104 via the secure direct peer-to-peer connection 600, and the electronic device 104 can complete the purchase with the merchant server 121 using the token. For example, by providing the token from the electronic device 104 to the merchant server 121, the merchant server 121 can identify the authorized purchase for the electronic device 104, even without maintaining a persistent connection with the electronic device 104 during the purchase operations.

Although the example of FIGS. 9 and 10 describes a companion device approval for a purchase, this is merely illustrative and companion device approval and/or authentication for other operations can also be provided. For example, in one or more implementations, the operations described in connection with FIGS. 9 and 10 can also be used to provide companion device approval for operations other than purchases, such as approval operations for viewing user-related information such as subscription information or other private information, approval operations for Terms and Conditions (e.g., for accepting Terms and Conditions for access to media or other content via a smart speaker), and/or approval operations for downloading and/or installing software such as applications (e.g., free applications for which no purchase is associated).

Figure 11:
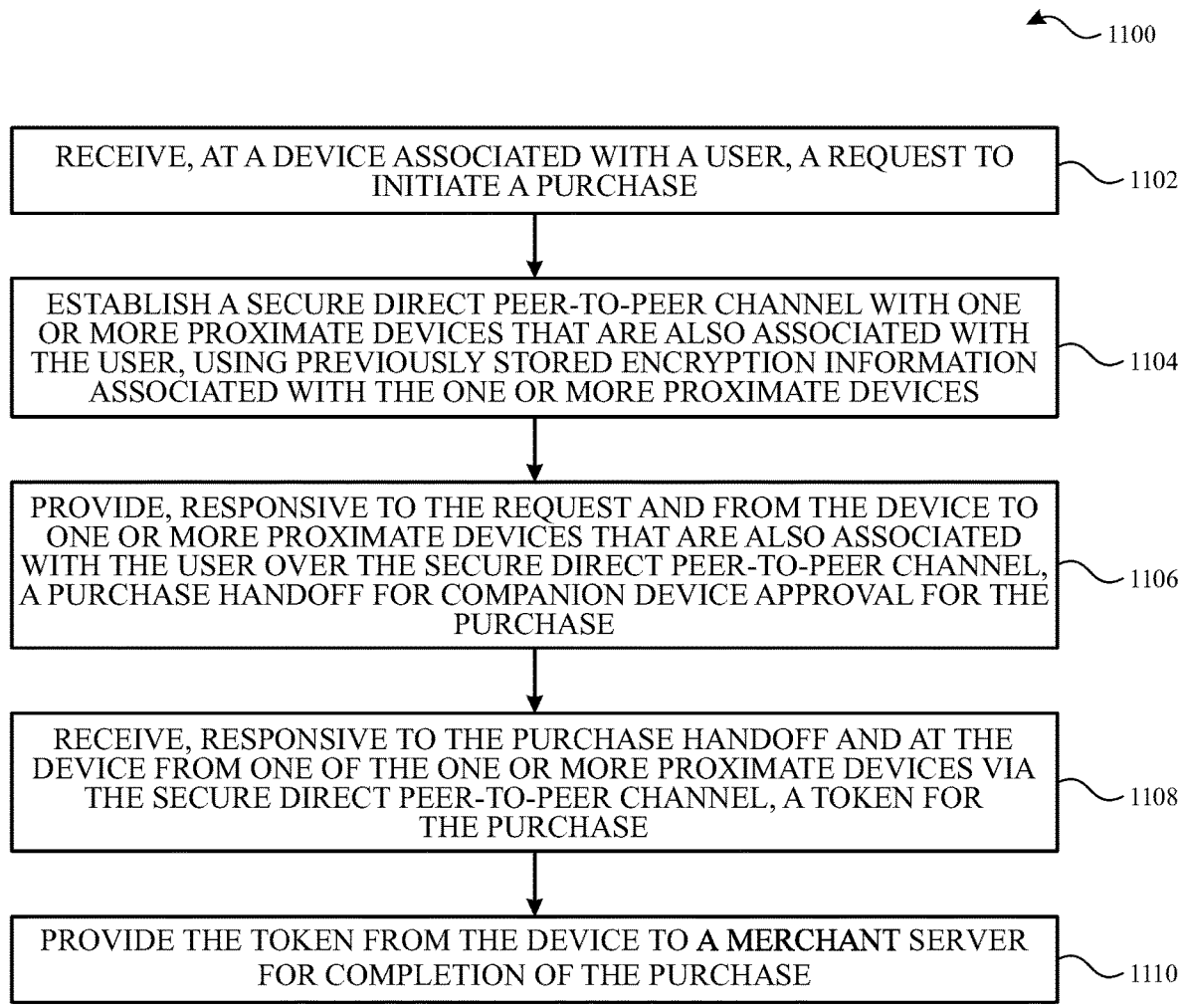
FIG. 11 illustrates a flow diagram of an example process that can be performed by a requesting device for companion device purchase approval in accordance with one or more implementations.

FIG. 11 illustrates a flow diagram of an example process 1100 for companion device approval operations that may be performed by a requesting device in accordance with one or more implementations. For explanatory purposes, the process 1100 is primarily described herein with reference to the electronic device 104, the electronic device 106, and the merchant server 121 of FIGS. 1, 9, and 10. However, the process 1100 is not limited to electronic device 104, the electronic device 106, and the merchant server 121 of FIGS. 1, 9, and 10, and one or more blocks (or operations) of the process 1100 may be performed by one or more other suitable devices and/or for authentication with other devices or services. Further for explanatory purposes, the blocks of the process 1100 are described herein as occurring in serial, or linearly. However, multiple blocks of the process 800 may occur in parallel. In addition, the blocks of the process 1100 need not be performed in the order shown and/or one or more blocks of the process 1100 need not be performed and/or can be replaced by other operations.

At block 1102, a device (e.g., electronic device 104) associated with a user may receive a request to initiate an approval process (e.g., a purchase or other approval operation) with a server such as a merchant server (e.g., merchant server 121).

At block 1104, the device may establish a secure direct peer-to-peer channel with one or more proximate devices (e.g., electronic device 106) that are also associated with the user, using previously stored encryption information associated with the one or more proximate devices. In one or more implementations, prior to establishing the secure direct peer-to-peer channel, the device may provide a notification (e.g., notification 922), the notification including a user-selectable option (e.g., selectable option 904) to complete the initiated approval process (e.g., purchase) using the one or more proximate devices.

At block 1106, the device may provide, responsive to the request and to one or more proximate devices that are also associated with the user (e.g., the same user associated with a single common user account) over the secure direct peer-to-peer channel, a request (e.g., an approval handoff such as a purchase handoff) for companion device approval (e.g., for the purchase or other approval operation).

At block 1108, the device may receive, responsive to the request for companion device approval and at the device from one of the one or more proximate devices via the secure direct peer-to-peer channel, a token (e.g., a delegate token) for the approval process (e.g., for the purchase). For example, the token may be an encrypted string that has been provided from the server to the one of the one or more proximate devices (e.g., in the body of a hypertext transfer protocol (HTTP) response from the server), and then provided to the device from the one of the one or more proximate devices as an HTTP header. For example, the token may include and/or be provided along with identifying information of the approval process (e.g., identifying information of the purchase).

At block 1110, the device may provide the token to the server for completion of the approval process (e.g., the purchase).

Figure 12:
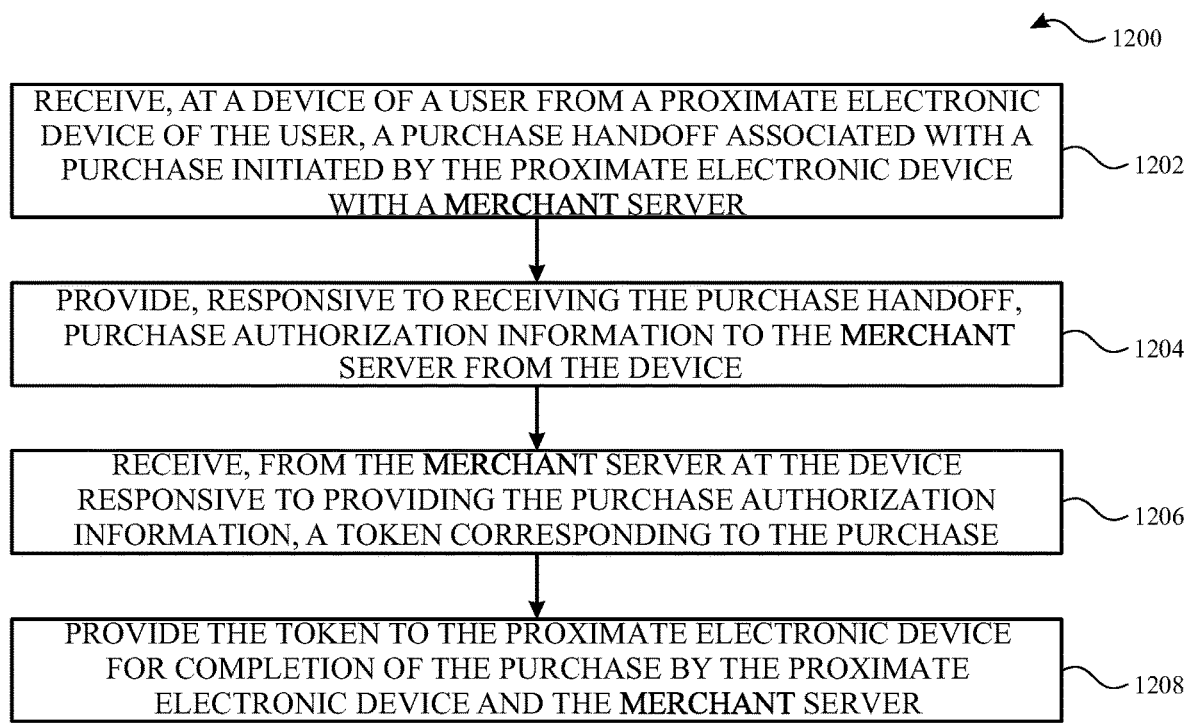
FIG. 12 illustrates a flow diagram of an example process that can be performed by an approval device for companion device purchase approval in accordance with one or more implementations.

FIG. 12 illustrates a flow diagram of an example process 1200 for companion device approval operations that may be performed by an approval device in accordance with one or more implementations. For explanatory purposes, the process 1200 is primarily described herein with reference to the electronic device 104, the electronic device 106, and the merchant server 121 of FIGS. 1, 9, and 10. However, the process 1200 is not limited to the electronic device 104, the electronic device 106, and the merchant server 121 of FIGS. 1, 9, and 10, and one or more blocks (or operations) of the process 1200 may be performed by one or more other suitable devices and/or for authentication with other devices or services. Further for explanatory purposes, the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

At block 1202, a device of a user (e.g., electronic device 106) may receive, from a proximate electronic device of the user (e.g., electronic device 104), an approval handoff (e.g., a purchase handoff as described in the example of FIGS. 10 and 11) associated with an approval process (e.g., a purchase or other approval operation) initiated by the proximate electronic device with a server such as a merchant server (e.g., merchant server 121). The device may also establish a secure direct peer-to-peer channel between the device and the proximate electronic device using previously stored encryption information associated with the proximate electronic device, such as a secure direct connection or a secure connection through one or more servers. The approval handoff may be received over the secure direct peer-to-peer channel in one or more implementations.

At block 1204, the device may provide, responsive to receiving the approval handoff, approval authorization information to the server from the device. The device may obtain user approval to perform the approval process associated with the handoff, and may obtain user authentication prior to providing the approval authorization information to the server. For example, in one or more implementations, the device may provide, prior to providing the approval authorization information to the server, a notification (e.g., notification 1004) including a request for user approval of the approval process using the device. The device may receive the user approval at the device from the user, authenticate the user with the device (e.g., using an authentication credential such as a password or passcode stored at the device or entered by the user, and/or a biometric authentication obtained at the device), and provide the approval authorization information to the server responsive to authenticating the user. In one or more implementations, the approval authorization information may include, or facilitate access to, payment information that can be used to process a payment for the service with a payment server.

At block 1206, the device may receive, from the server at the device responsive to providing the approval authorization information, a token corresponding to the purchase. The token may be generated and/or verified by the server prior to providing the token to the device. The token may be provided to the device, for example, as an encrypted string in the body of the HTTP response from the server.

At block 1208, the device may provide the token to the proximate electronic device, for completion of the approval process by the proximate electronic device and the server. The token may be provided from the device to the proximate electronic device via the secure direct peer-to-peer channel in one or more implementations. For example, the encrypted string received from the server may be provided from the device to the proximate electronic device as an HTTP header that is sent to the proximate electronic device via the secure direct peer-to-peer channel.

As described above, one aspect of the present technology is the gathering and use of data available from specific and legitimate sources for companion device authentication. The present disclosure contemplates that in some instances, this gathered data may include personal information data that uniquely identifies or can be used to identify a specific person. Such personal information data can include demographic data, location-based data, online identifiers, telephone numbers, email addresses, home addresses, encryption information, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for establishing a secure direct peer-to-peer connection between a device and companion device for exchange of authentication information. Accordingly, use of such personal information data may facilitate authentication operations. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of companion device authentication, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 13:
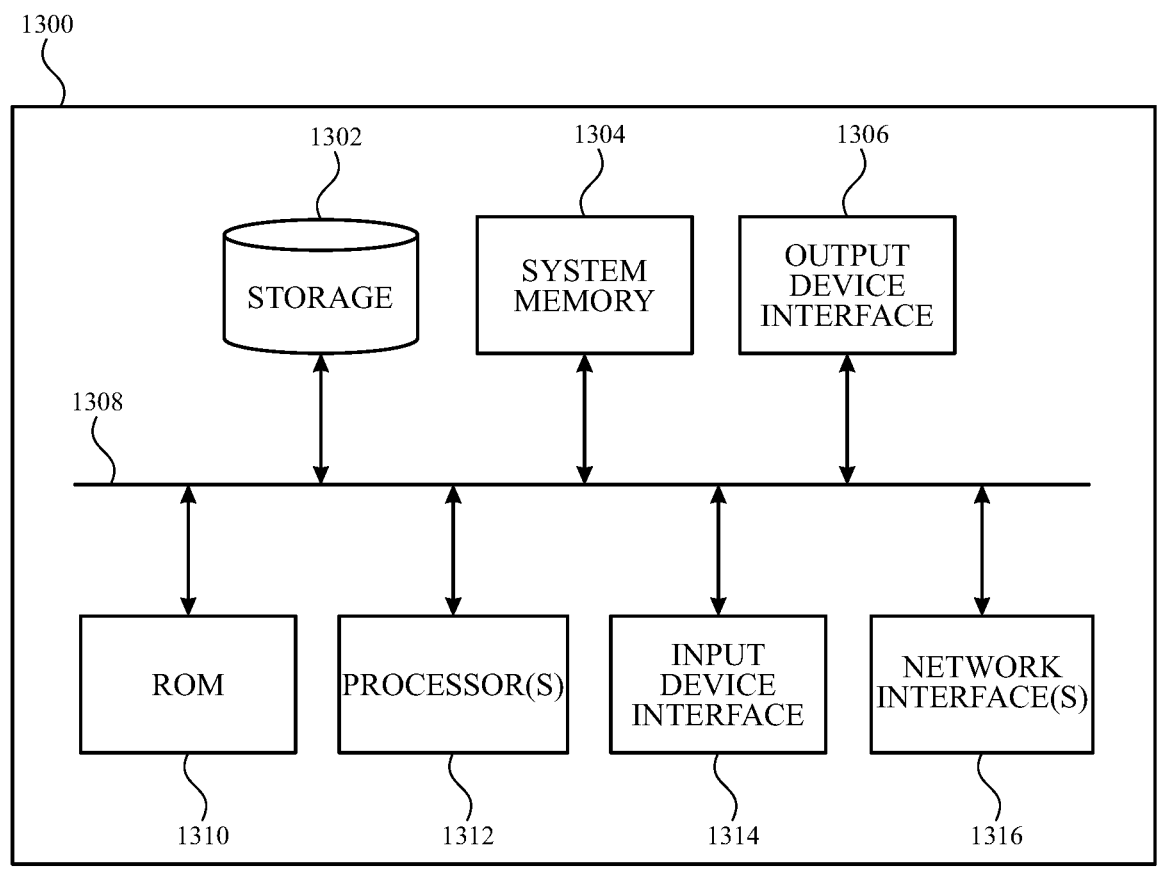
FIG. 13 illustrates an example electronic system with which aspects of the subject technology may be implemented in accordance with one or more implementations.

FIG. 13 illustrates an electronic system 1300 with which one or more implementations of the subject technology may be implemented. The electronic system 1300 can be, and/or can be a part of, one or more of the electronic devices 102-107, the content provider 112. the cloud-based service 114, and/or the merchant server 121 shown in FIG. 1. The electronic system 1300 may include various types of computer readable media and interfaces for various other types of computer readable media. The electronic system 1300 includes a bus 1308, one or more processing unit(s) 1312, a system memory 1304 (and/or buffer), a ROM 1310, a permanent storage device 1302, an input device interface 1314, an output device interface 1306, and one or more network interfaces 1316, or subsets and variations thereof.

The bus 1308 collectively represents all system, peripheral, and chipset buses that communicatively connect the numerous internal devices of the electronic system 1300. In one or more implementations, the bus 1308 communicatively connects the one or more processing unit(s) 1312 with the ROM 1310, the system memory 1304, and the permanent storage device 1302. From these various memory units, the one or more processing unit(s) 1312 retrieves instructions to execute and data to process in order to execute the processes of the subject disclosure. The one or more processing unit(s) 1312 can be a single processor or a multi-core processor in different implementations.

The ROM 1310 stores static data and instructions that are needed by the one or more processing unit(s) 1312 and other modules of the electronic system 1300. The permanent storage device 1302, on the other hand, may be a read-and-write memory device. The permanent storage device 1302 may be a non-volatile memory unit that stores instructions and data even when the electronic system 1300 is off. In one or more implementations, a mass-storage device (such as a magnetic or optical disk and its corresponding disk drive) may be used as the permanent storage device 1302.

In one or more implementations, a removable storage device (such as a floppy disk, flash drive, and its corresponding disk drive) may be used as the permanent storage device 1302. Like the permanent storage device 1302, the system memory 1304 may be a read-and-write memory device. However, unlike the permanent storage device 1302, the system memory 1304 may be a volatile read-and-write memory, such as random access memory. The system memory 1304 may store any of the instructions and data that one or more processing unit(s) 1312 may need at runtime. In one or more implementations, the processes of the subject disclosure are stored in the system memory 1304, the permanent storage device 1302, and/or the ROM 1310. From these various memory units, the one or more processing unit(s) 1312 retrieves instructions to execute and data to process in order to execute the processes of one or more implementations.

The bus 1308 also connects to the input and output device interfaces 1314 and 1306. The input device interface 1314 enables a user to communicate information and select commands to the electronic system 1300. Input devices that may be used with the input device interface 1314 may include, for example, alphanumeric keyboards and pointing devices (also called "cursor control devices"). The output device interface 1306 may enable, for example, the display of images generated by electronic system 1300. Output devices that may be used with the output device interface 1306 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 13, the bus 1308 also couples the electronic system 1300 to one or more networks and/or to one or more network nodes, such as the content provider 112 shown in FIG. 1, through the one or more network interface(s) 1316. In this manner, the electronic system 1300 can be a part of a network of computers (such as a LAN, a wide area network ("WAN"), or an Intranet, or a network of networks, such as the Internet. Any or all components of the electronic system 1300 can be used in conjunction with the subject disclosure.

In accordance with aspects of the disclosure, a method is provided that includes receiving, at a system process of a device from an application on the device, a request for authentication information for the application; broadcasting, from the device to one or more proximate devices responsive to the request, a beacon for companion device authentication for the application; receiving, by the system process of the device from one of the one or more proximate devices, a nomination of the one of the one or more proximate devices to provide the companion device authentication; responsive to receiving the nomination, by the device: discontinuing broadcasting of the beacon, establishing a secure direct peer-to-peer channel with the one of the one or more proximate devices using previously stored encryption information associated with the one of the one or more proximate devices, and providing information associated with the application and the request for authentication to the one of the one or more proximate devices via the secure direct peer-to-peer channel; receiving the authentication information for the application by the system process of the device from the one of the one or more proximate devices responsive to providing the information; providing the received authentication information from the system process to the application; and executing, with the application, an authentication using the received authentication information.

In accordance with aspects of the disclosure, a non-transitory machine-readable medium is provided storing instructions that, when executed by one or more processors, cause the one or more processors to perform operations that include receiving, at an electronic device from another device, a beacon for companion device authentication for an application at the other device; prior to displaying a notification related to the beacon, receiving a user input indicating a nomination of the electronic device for providing the companion device authentication; responsive to receiving the beacon and the user input, sending a nomination signal to the other device; receiving, responsive to sending the nomination signal, information associated with the companion device authentication; and displaying a user notification using the information.

In accordance with aspects of the disclosure, an electronic device is provided that includes memory, and one or more processors, where the one or more processors are configured to receive, from another device, a beacon for companion device authentication for an application at the other device; prior to displaying a notification related to the beacon, receive a user input indicating a nomination of the electronic device for providing the companion device authentication; responsive to receiving the beacon and the user input, send a nomination signal to the other device; receive, responsive to sending the nomination signal, information associated with the companion device authentication; and display a user notification using the received information.

In accordance with aspects of the disclosure, a method is provided that includes receiving, at a device associated with a user, a request to initiate an approval process with a server; establishing a secure direct peer-to-peer channel with one or more proximate devices that are also associated with the user, using previously stored encryption information associated with the one or more proximate devices; providing, responsive to the request and from the device to one or more proximate devices that are also associated with the user over the secure direct peer-to-peer channel, a request for companion device approval; receiving, responsive to the request for companion device approval and at the device from one of the one or more proximate devices via the secure direct peer-to-peer channel, a token for the approval process; and providing the token from the device to the server for completion of the approval process.

In accordance with aspects of the disclosure, a method is provided that includes receiving, at a device of a user from a proximate electronic device of the user, an approval handoff associated with an approval process initiated by the proximate electronic device with a server; providing, responsive to receiving the approval handoff, approval authorization information to the server from the device; receiving, from the server at the device responsive to providing the approval authorization information, a token corresponding to the approval; and providing the token to the proximate electronic device for completion of the approval process by the proximate electronic device and the merchant server.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    receiving, at a system process of a device from an application on the device, a request for authentication information for the application;
    broadcasting, from the device to one or more proximate devices responsive to the request, a beacon for companion device authentication for the application;
    receiving, by the system process of the device from one of the one or more proximate devices, a nomination of the one of the one or more proximate devices to provide the companion device authentication;
    responsive to receiving the nomination, by the device:
        establishing a secure direct peer-to-peer channel with the one of the one or more proximate devices using previously stored encryption information associated with the one of the one or more proximate devices, and
        providing information associated with the application and the request for authentication to the one of the one or more proximate devices via the secure direct peer-to-peer channel;
    receiving the authentication information for the application by the system process of the device from the one of the one or more proximate devices responsive to providing the information; and
    providing the received authentication information from the system process to the application.

2. The method of claim 1, wherein the application is associated with a content provider or a cloud-based service, and the system process executes on the device separately from the application executing on the device.

3. The method of claim 2, wherein the device is associated with a first user account of the device, and wherein the authentication information is associated with a second user account of the one of the one or more proximate devices.

4. The method of claim 3, wherein the first user account is an account with a cloud-based service, and wherein the second user account is an account with a content provider.

5. The method of claim 1, further comprising, prior to the request for the authentication information:
    pairing the device with the one of the one or more proximate devices; and
    storing the encryption information associated with the one of the one or more proximate devices based on the pairing.

6. The method of claim 1, wherein the device is a device of a first user, and the one of the one or more proximate devices is a device associated with a member of a family of the first user or a home of the first user.

7. The method of claim 1, wherein the authentication information comprises a token, or a password.

8. The method of claim 1, further comprising, responsive to receiving the nomination, by the device, discontinuing broadcasting of the beacon.

9. The method of claim 1, further comprising, executing, with the application, an authentication using the received authentication information.

10. An electronic device, comprising:
memory; and
one or more processors, wherein the one or more processors are configured to:
receive, from another device, a beacon for companion device authentication for an application at the other device;
prior to displaying a notification related to the beacon, receive a user input indicating a nomination of the electronic device for providing the companion device authentication;
responsive to receiving the beacon and the user input, send a nomination signal to the other device;
receive, responsive to sending the nomination signal, information associated with the companion device authentication; and
display a user notification using the received information.

11. The electronic device of claim 10, wherein the user notification includes a name of the application at the other device and an identifier of the other device.

12. The electronic device of claim 10, wherein receiving the information associated with the companion device authentication comprises receiving the information in a companion device authentication request, and wherein the one or more processors are further configured to:
receive a user input indicating acceptance of the companion device authentication request;
obtain authentication information stored at the electronic device; and
provide the authentication information to the other device.

13. The electronic device of claim 12, wherein the electronic device is associated with a first user account of a first user, and wherein the other device is associated with a second user account of a second user.

14. The electronic device of claim 13, wherein the authentication information comprises a token corresponding to the first user account of the first user.

15. The electronic device of claim 13, wherein the authentication information comprises a password associated with a third user account of the first user, the third user account associated with a content provider.

16. The electronic device of claim 12, wherein the authentication information comprises a password.

17. The electronic device of claim 10, wherein the electronic device does not have local access to the application.

18. The electronic device of claim 10, wherein the user input comprises a movement of the electronic device prior to the display of the user notification.

19. The electronic device of claim 10, wherein receiving the information associated with the companion device authentication comprises receiving the information in a companion device authentication request, and wherein the one or more processors are further configured to:
receive a user input indicating acceptance of the companion device authentication request; and
provide a redirect to a webpage for the companion device authentication.

20. A non-transitory machine-readable medium storing instructions that, when executed by one or more processors, cause the one or more processors to perform operations that include:
receiving, at an electronic device from another device, a beacon for companion device authentication for an application at the other device;
prior to displaying a notification related to the beacon, receiving a user input indicating a nomination of the electronic device for providing the companion device authentication;
responsive to receiving the beacon and the user input, sending a nomination signal to the other device;
receiving, responsive to sending the nomination signal, information associated with the companion device authentication; and
displaying a user notification using the information.

21. The non-transitory machine-readable medium of claim 20, wherein the user notification includes a title of the application at the other device and an identifier of the other device.

22. The non-transitory machine-readable medium of claim 20, wherein receiving the information associated with the companion device authentication comprises receiving the information in a companion device authentication request, and wherein the operations further include:
receiving a user input indicating acceptance of the companion device authentication request;
obtaining authentication information stored at the electronic device; and
providing the authentication information to the other device.

23. A method comprising:
receiving, by an electronic device and from another device, a beacon for companion device authentication for an application at the other device;
prior to displaying a notification related to the beacon, receiving a user input indicating a nomination of the electronic device for providing the companion device authentication;
responsive to receiving the beacon and the user input, sending a nomination signal to the other device;
receiving, responsive to sending the nomination signal, information associated with the companion device authentication; and
displaying a user notification using the received information.

24. The method of claim 23, wherein the user notification includes a name of the application at the other device and an identifier of the other device.

25. The method of claim 23, wherein receiving the information associated with the companion device authentication comprises receiving the information in a companion device authentication request, and wherein the method further comprises:
receiving a user input indicating acceptance of the companion device authentication request;
obtaining authentication information stored at the electronic device; and
providing the authentication information to the other device.

26. The method of claim 25, wherein the authentication information comprises a password.

27. The method of claim 23, wherein the electronic device does not have local access to the application.

28. The method of claim 23, wherein the user input comprises a movement of the electronic device prior to the display of the user notification.

29. The method of claim 23, wherein receiving the information associated with the companion device authentication comprises receiving the information in a companion device authentication request, and the method further comprises:
  receiving a user input indicating acceptance of the companion device authentication request; and
  providing a redirect to a webpage for the companion device authentication.

30. A non-transitory computer-readable medium comprising instructions that, when executed by one or more processors of a device, cause the one or more processors to perform operations comprising:
  receiving, at a system process of the device from an application on the device, a request for authentication information for the application;
  broadcasting, from the device to one or more proximate devices responsive to the request, a beacon for companion device authentication for the application;
  receiving, by the system process of the device from one of the one or more proximate devices, a nomination of the one of the one or more proximate devices to provide the companion device authentication;
  responsive to receiving the nomination, by the device:
    establishing a secure direct peer-to-peer channel with the one of the one or more proximate devices using previously stored encryption information associated with the one of the one or more proximate devices, and
    providing information associated with the application and the request for authentication to the one of the one or more proximate devices via the secure direct peer-to-peer channel;
  receiving the authentication information for the application by the system process of the device from the one of the one or more proximate devices responsive to providing the information; and
  providing the received authentication information from the system process to the application.

* * * * *